US012361880B2

(12) United States Patent
Lee et al.

(10) Patent No.: US 12,361,880 B2
(45) Date of Patent: Jul. 15, 2025

(54) LIGHT EMITTING DISPLAY APPARATUS WITH DRIVING TRANSISTOR FORMED OF AN OXIDE SEMICONDUCTOR

(71) Applicant: LG Display Co., Ltd., Seoul (KR)

(72) Inventors: MinKyung Lee, Paju-si (KR); ChangHoon Jeon, Paju-si (KR); Li-Jin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/425,453

(22) Filed: Jan. 29, 2024

(65) Prior Publication Data

US 2024/0257741 A1 Aug. 1, 2024

(30) Foreign Application Priority Data

Jan. 30, 2023 (KR) ........................ 10-2023-0012058

(51) Int. Cl.
*G09G 3/30* (2006.01)
*G09G 3/3233* (2016.01)

(52) U.S. Cl.
CPC ..................... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2340/0435* (2013.01)

(58) Field of Classification Search
CPC ......... G09G 3/3233; G09G 2300/0819; G09G 2300/0842; G09G 2300/0861; G09G 2340/0435; G08G 2320/0247
See application file for complete search history.

(56) References Cited

U.S. PATENT DOCUMENTS

| | | | | |
|---|---|---|---|---|
| 2021/0201798 | A1* | 7/2021 | Kim | G09G 3/3233 |
| 2022/0148510 | A1 | 5/2022 | Ryu | |
| 2023/0034225 | A1* | 2/2023 | Tanaka | G09G 3/3241 |

FOREIGN PATENT DOCUMENTS

| | | | |
|---|---|---|---|
| KR | 10-2022-0062844 | A | 5/2022 |

* cited by examiner

*Primary Examiner* — Sanghyuk Park
(74) *Attorney, Agent, or Firm* — Morgan, Lewis & Bockius LLP

(57) ABSTRACT

A light emitting display apparatus includes a pixel including a pixel driving circuit and a light emitting device, and a gate driver supplying gate signals to the pixel driving circuit. The pixel driving circuit includes a switching transistor, a driving transistor, and a first light emitting transistor. The first light emitting transistor is connected between an anode of the light emitting device and a first node, the driving transistor controls the size of the current supplied to the light emitting device through the first node and the first light emitting transistor, and the switching transistor controls the supply of a data voltage to the light emitting device through the first node. During the use of the light emitting display apparatus, one second is divided into a refresh period and an anode reset period, and the switching transistor is turned on only during the refresh period.

20 Claims, 12 Drawing Sheets

100

LIGHT EMITTING DISPLAY APPARATUS WITH DRIVING TRANSISTOR FORMED OF AN OXIDE SEMICONDUCTOR

CROSS-REFERENCE TO RELATED APPLICATIONS

This application claims the benefit of the Korean Patent Application No. 10-2023-0012058 filed on Jan. 30, 2023, which is hereby incorporated by reference as if fully set forth herein.

BACKGROUND

Technical Field

The present disclosure relates to a light emitting display apparatus.

Discussion of the Related Art

A light emitting display apparatus can output light by itself to display an image.

A light emitting display apparatus is mounted on or in electronic products, such as televisions, monitors, notebook computers, smart phones, tablet computers, electronic pads, wearable devices, watch phones, portable information devices, navigation devices, or vehicle control display devices to perform a function of displaying images.

SUMMARY

For example, in a light emitting display apparatus applied to an electronic device in which images are not changed much, such as an electronic watch, data voltages are supplied to data lines only during a refresh period among 1 second in order to improve power consumption, and light emissions of light emitting devices are controlled by using light emitting control signals during an anode reset period except for the refresh period among 1 second.

However, in a light emitting display apparatus driven by the above method, threshold voltages of driving transistors and the hysteresis characteristics of the driving transistors are changed, so that the luminance of the light emitting devices in a refresh period and the luminance of the light emitting devices in an anode reset period may vary. Accordingly, the images displayed in the refresh period and the images displayed in the anode reset period may vary. That is, a flicker may occur.

Moreover, in the light emitting display apparatus driven by the above method, the light emitting device can be abnormally driven because a voltage which can compensate for the change in the characteristics of an anode of the light emitting device is not supplied during the anode reset period. Accordingly, the luminance of the light emitting device in the refresh period and the luminance of the light emitting device in the anode reset period may vary, so the images displayed in the refresh period and the images displayed in the anode reset period may vary. That is, a flicker may occur.

Accordingly, embodiments of the present disclosure are directed to a light emitting display apparatus that substantially obviates one or more problems due to limitations and disadvantages of the related art.

An aspect of the present disclosure is to provide a light emitting display apparatus in which a driving transistor controlling the magnitude of the current supplied to a light emitting device is formed of an oxide semiconductor.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a light emitting display apparatus comprises a light emitting display panel provided with a pixel including a pixel driving circuit and a light emitting device, and a gate driver supplying gate signals to the pixel driving circuit, wherein the pixel driving circuit comprises a switching transistor, a driving transistor, and a first light emitting transistor, the first light emitting transistor is connected between an anode of the light emitting device and a first node, the driving transistor controls the size of the current supplied to the light emitting device through the first node and the first light emitting transistor, the switching transistor controls the supply of a data voltage to the light emitting device through the first node, during the use of the light emitting display apparatus, one second is divided into a refresh period and an anode reset period, the switching transistor is turned on only during the refresh period, and the driving transistor is formed of an oxide semiconductor.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure. In the drawings.

DETAILED DESCRIPTION

Figure 1:
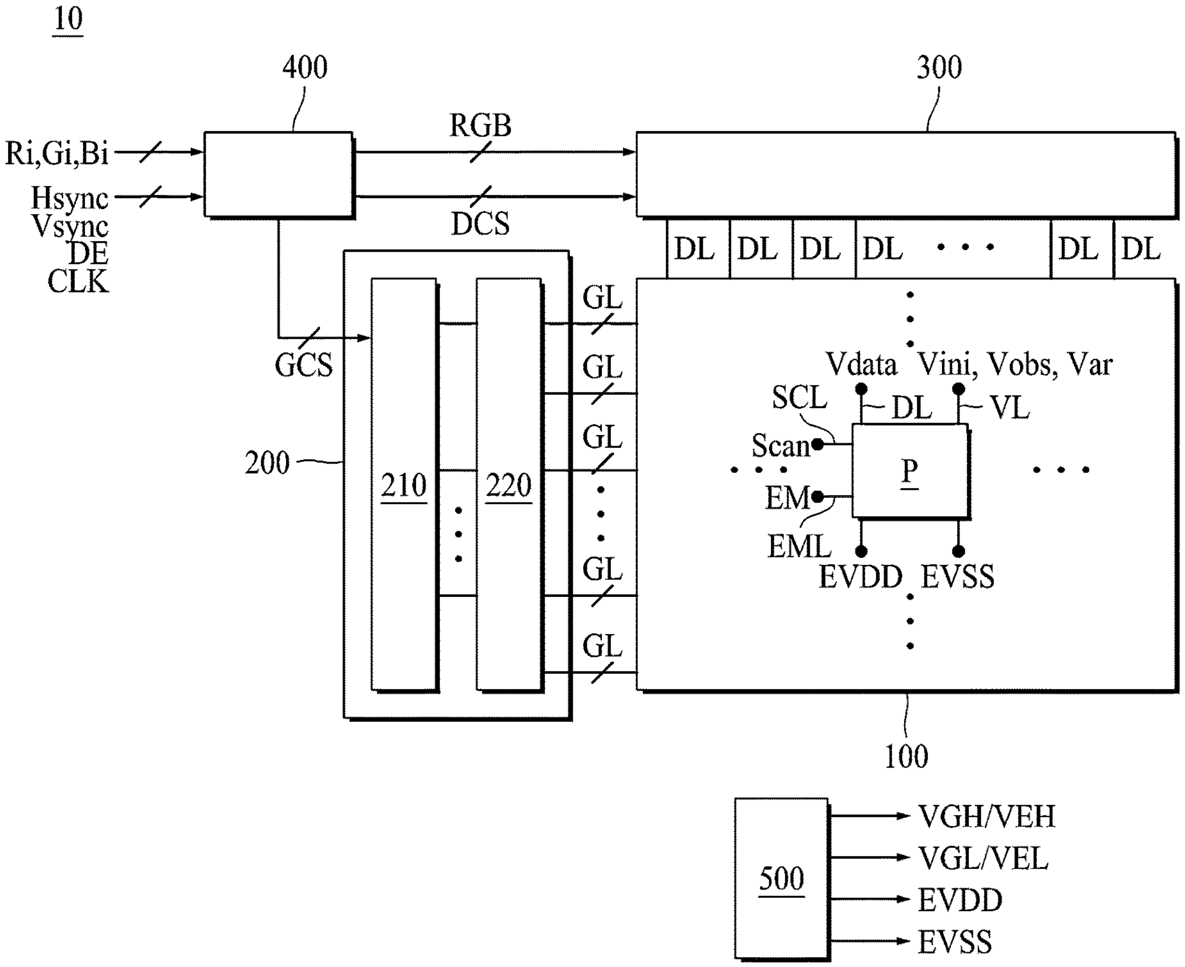
FIG. 1 is a block diagram schematically illustrating a light emitting display apparatus according to the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the description. In the following description, when the detailed description of the relevant known function or configuration is determined to unnecessarily obscure the important point of the present disclosure, the detailed description will be omitted. When "comprise", "have" and "include" described in the present disclosure are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on", "over", "under" and "next", one or more other parts may be disposed between the two parts unless a more limiting term, such as "just" or "direct(ly)" is used.

In describing a time relationship, for example, when the temporal order is described as, for example, "after", "subsequent", "next" and "before", a case that is not continuous may be included unless a more limiting term, such as "just", "immediate(ly)" or "direct(ly)" is used.

It will be understood that, although the terms "first", "second", etc. may be used herein to describe various elements, these elements should not be limited by these terms. These terms are only used to distinguish one element from another element. For example, a first element could be termed a second element, and, similarly, a second element could be termed a first element, without departing from the scope of the present disclosure.

In describing elements of the present disclosure, the terms "first", "second", "A", "B", "(a)", "(b)", etc. may be used. These terms are intended to identify the corresponding elements from the other elements, and basis, order, or number of the corresponding elements should not be limited by these terms. The expression that an element or layer is "connected", "coupled" or "adhered" to another element or layer should be understood as the element or layer can not only be directly connected or adhered to another element or layer, but also be indirectly connected or adhered to another element or layer with one or more intervening elements or layers "disposed" or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

FIG. 1 is a block diagram schematically illustrating a light emitting display apparatus according to the present disclosure.

Referring to FIG. 1, a light emitting display apparatus 10 includes a light emitting display panel 100 including pixels P (specially, a plurality of pixels P, and for simplicity, only one pixel P is shown in FIG. 1), a control driver 400, a gate driver 200 supplying a gate signal to each of the pixels P, a data driver 300 supplying a data voltage to each of the pixels P, and a power supply 500 supplying power to each of the pixels P.

Figure 12:
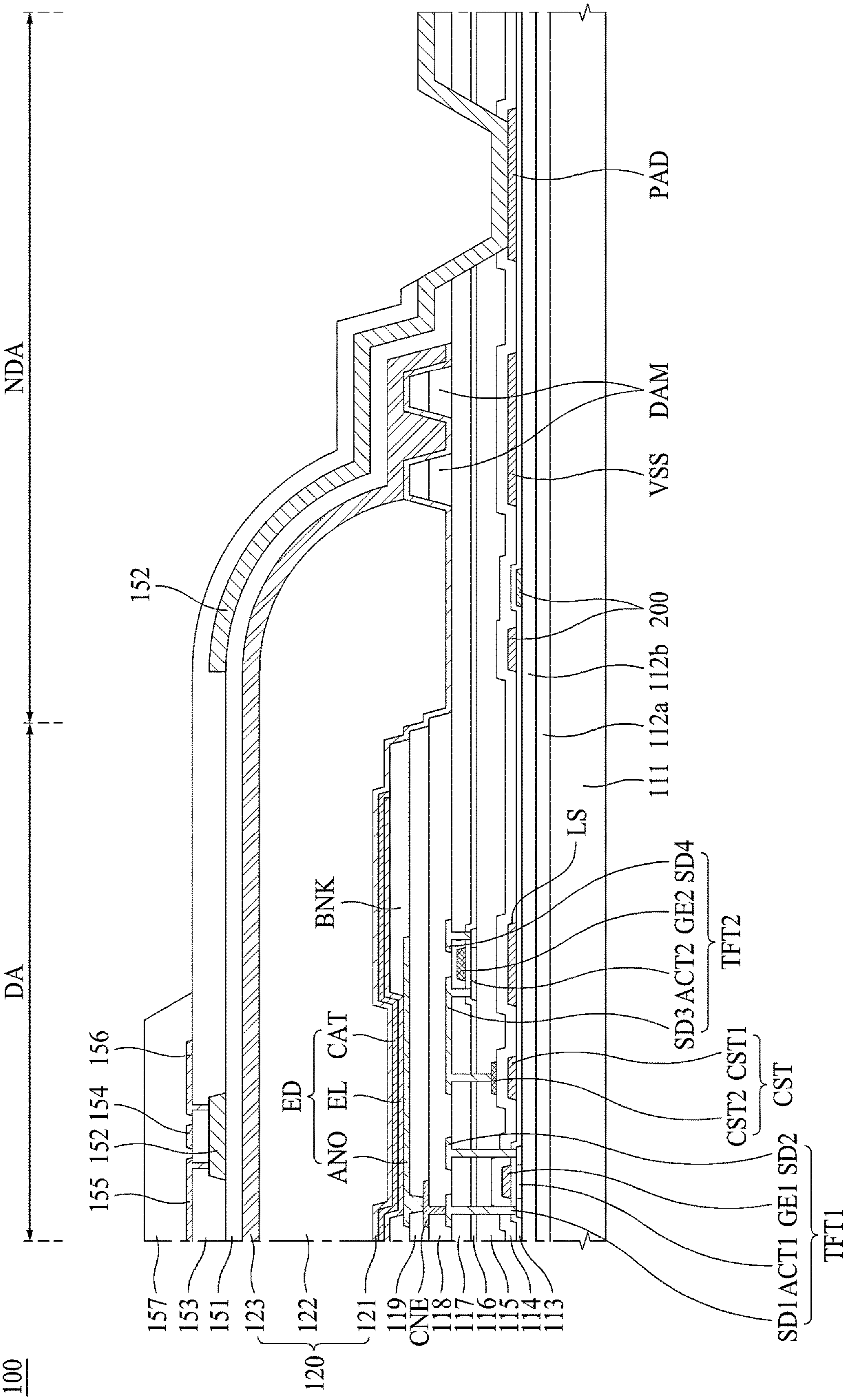
FIG. 12 is a cross-sectional view illustrating a stacked form of a light emitting display panel applied to a light emitting display apparatus according to an embodiment of the present disclosure.

The light emitting display panel 100 includes a display area where the pixel P is provided and a non-display area where the gate driver 200 and the data driver 300 are provided. The non-display area NDA (as shown in FIG. 12) is provided to surrounds the display area DA (as shown in FIG. 12).

In the light emitting display panel 100, the gate lines GL and the data lines DL cross each other, and each of the pixels P is connected to the gate line GL and the data line DL. Specifically, a pixel P receives a gate signal from the gate driver 200 through the gate line GL, a data voltage from the data driver 300 through the data line DL, and a high potential driving voltage (for example, a first voltage) EVDD and a low potential driving voltage (for example, a second voltage) EVSS from the power supply 500.

Here, the gate lines GL supply scan signals Scan and light emitting control signals EM, and the data lines DL supply data voltages Vdata. Moreover, in various embodiments, each of the gate lines GL may include at least one scan line SCL supplying a scan signal Scan and at least one light emitting control signal line EML supplying a light emitting control signal EM. Also, the pixels P may receive a bias voltage Vobs, an initialization voltage Vini, and a compensation voltage Var through a power line VL.

Each of the pixels P may include a light emitting device ED and a pixel driving circuit controlling the operation of the light emitting device ED. Here, the light emitting device ED may include an anode electrode (or briefly referred to as anode), a cathode electrode (or briefly referred to as cathode), and a light emitting layer between the anode electrode and the cathode electrode.

The pixel driving circuit may include a switching device, a driving device, and a capacitor. Here, each of the switching device and the driving device may be composed of a thin film transistor. In the pixel driving circuit, the driving device may control the amount of current supplied to the light emitting device ED on the basis of a data voltage to adjust the amount of light emitted by the light emitting device ED. Moreover, the switching device may receive a scan signal Scan supplied through a scan line SCL and a light emitting control signal EM supplied through a light emission control line EML to operate the pixel driving circuit.

The light emitting display panel 100 may be implemented as a non-transmissive type display panel or a transmissive type display panel. The transmissive type display panel may be applied to a transparent display apparatus in which an image is displayed on a screen and a real object of a background is visible. A light emitting display panel 100 may be manufactured as a flexible display panel. The flexible display panel may be implemented as an OLED panel using a plastic substrate.

The pixels P may include a red pixel, a green pixel, and a blue pixel for color implementation. The pixels P may further include a white pixel. Each of the pixels P may include a pixel driving circuit.

Touch sensors may be disposed on the light emitting display panel 100. A touch input may be sensed using separate touch sensors or sensed through pixels P. Touch sensors may be provided on the light emitting display panel in an on-cell type or an add-on type, or may be implemented as in-cell type touch sensors embedded in the light emitting display panel 100.

The control driver 400 processes input image data Ri, Gi, and Bi input from the outside according to the size and resolution of the light emitting display panel 100 and supplies the image data to the data driver 300. The control driver 400 generates a gate control signal GCS and a data control signal DCS by using synchronization signals input from the outside, for example, dot clock signal CLK, data enable signal DE, horizontal synchronization signal Hsync, and vertical synchronization signal Vsync. The control driver 400 supplies the gate control signal GCS and the data control signal DCS generated in the control driver to the gate driver 200 and the data driver 300 respectively to control the gate driver 200 and the data driver 300.

The control driver 400 may be configured in combination with various processors, for example, microprocessors, mobile processors, application processors, etc.

A host system may be any one of a television (TV) system, a set-top box, a navigation system, a personal computer (PC), a home theater system, a mobile device, a wearable device, and a vehicle system.

The control driver 400 may multiply the input frame frequency with i to control the operation timing of a light emitting display panel driver (for example, a gate driver and a data driver) with the frame frequency of the input frame frequency×i (i is a positive integer greater than 0) Hz. The input frame frequency is 60 Hz in the National Television Standards Committee (NTSC) method and 50 Hz in the Phase-Alternating Line (PAL) method.

The control driver 400 generates a signal so that the pixel P may be driven at various refresh rates. That is, the control driver 400 generates signals related to driving so that the pixel P can be driven in variable refresh rate (VRR) mode or can be driven between a first refresh rate and a second refresh rate. For example, the control driver 400 may simply change the speed of the clock signal, generate a synchronization signal to generate a horizontal blank or a vertical blank, or drive the gate driver 200 in a mask manner to drive the pixel P at various refresh rates.

Based on the timing signal Vsync, Hsync, and DE received from the host system, the control driver 400 generates a gate control signal GCS to control the operation timing of the gate driver 200 and a data control signal DCS to control the operation timing of the data driver 300. The control driver 400 controls the operation timing of the light emitting display panel driver to synchronize the gate driver 200 and the data driver 300.

The voltage level of the gate control signal GCS output from the control driver 400 can be converted into gate-on voltage VGL or VEL and gate-off voltage VGH or VEH through a level shifter and supplied to the gate driver 200. The level shifter converts the low level voltage of the gate control signal GCS into the gate low voltage VGL and converts the high level voltage of the gate control signal GCS into the gate high voltage VGH. The gate control signal GCS includes a start pulse and a shift clock. In the following description, VGH, VEH, VGL, VEL, etc. may be described in various terms. For example, VGH may be described as a gate-on voltage, a gate-off voltage, or a gate-first voltage. Moreover, in the following description, each of the elements may be described in different terms as needed.

The gate driver 200 supplies a scan signal Scan to the gate line GL based on the gate control signal GCS supplied from the control driver 400. The gate driver 200 may be disposed on one side or both sides of the light emitting display panel 100 in a gate-in panel (GIP) type.

The gate driver 200 sequentially outputs gate signals to a plurality of gate lines GL under the control of the control driver 400. The gate driver 200 may shift the gate signals by using a shift register to sequentially supply the gate signals to the gate lines GL.

The gate signal may be a scan signal Scan or a light emitting control signal EM.

The scan signal Scan may include a gate pulse which swings between a gate-on voltage (VGL or VGH) and a gate-off voltage (VGH or VGL).

The light emitting control signal EM may include a light emitting control signal pulse which swings between the gate-on voltage (VEL or VEH) and the gate-off voltage (VEH or VEL).

The gate pulse selects pixels P of a line to which a data voltage Vdata is to be supplied in synchronization with the data voltage Vdata. The emitting control signal EM determines the light emission time of the pixels P.

The gate driver 200 may include a light emitting control signal driver and a scan driver. The light emitting control signal driver may include at least one emitting control signal generator, and the scan driver may include at least one scan signal generator.

The light emitting control signal driver outputs a light emitting control signal pulse in response to a start pulse and a shift clock transmitted from the control driver 400, and sequentially shifts the light emitting control signal pulse based on the shift clock.

The scan driver outputs the gate pulse in response to the start pulse and the shift clock transmitted from the control driver 400, and shifts the gate pulse based on the shift clock timing.

The data driver 300 converts image data RGB into data voltage Vdata based on the data control signal DCS supplied from the control driver 400 and supplies the converted data voltage Vdata to the pixel P through the data line DL.

In FIG. 1, it is illustrated that the data driver 300 is provided in one form on one side of the light emitting display panel 100, but the number and position of the data driver 300 are not limited thereto.

That is, the data driver 300 may be composed of a plurality of integrated circuits (IC) and may be divided into a plurality of portions (or units) on one side of the light emitting display panel 100.

The power supply 500 uses a DC-DC converter to generate DC power required to drive the pixel array of the light emitting display panel 100 and the light emitting display panel driver. The DC-DC converter may include a charge pump, a regulator, a buck converter, a boost converter, and the like. The power supply 500 receives a DC input voltage supplied from a host system to generate DC voltages such as the gate-on voltages VGL and VEL, the gate-off voltages VGH and VEH, the high potential driving voltage EVDD, the low potential driving voltage EVSS, and the like. The gate-on voltages VGL and VEL and the gate-off voltages VGH and VEH are supplied to the level shifters and the gate drivers. The high potential driving voltage EVDD and the low potential driving voltage EVSS are commonly supplied to the pixels P. The magnitude of the gate-on voltage and the gate-off voltage may be variously changed based on the type of transistor. For example, a gate-on voltage in an N-type transistor may have a high level, and a gate-on voltage in a P-type transistor may have a low level.

Figure 2:
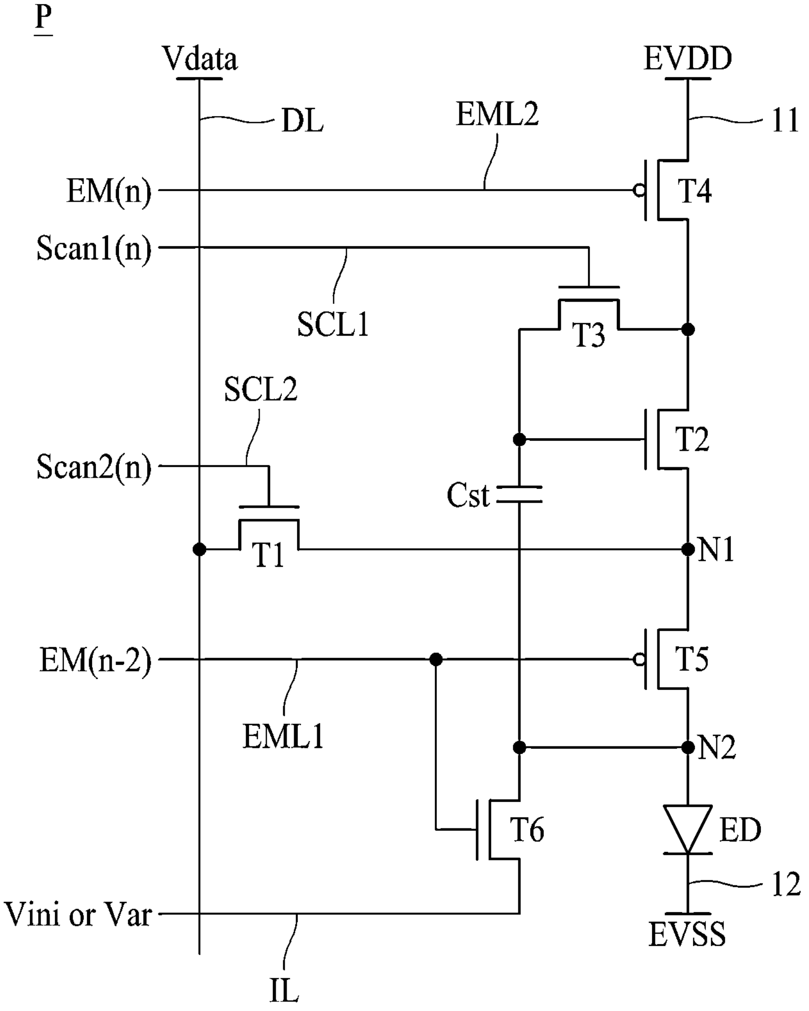
FIG. 2 is an exemplary diagram illustrating a pixel driving circuit and a light emitting device applied to a light emitting display apparatus according to an embodiment of the present disclosure.

FIG. 2 is an exemplary diagram illustrating a pixel driving circuit and a light emitting device applied to a light emitting display apparatus according to an embodiment of the present disclosure.

The light emitting display panel 100 is provided with gate lines GL, data lines DL, and pixels P. Accordingly, an image is output in the display area.

Each pixel P includes a pixel driving circuit and a light emitting device ED. In FIG. 2, an nth pixel P provided along the data line DL is illustrated. That is, the pixel P connected to the nth gate line GL is illustrated in FIG. 2. As described above, the gate line GL may include a scan signal line SCL which supplies a scan signal Scan and a light emitting control signal line EML which supplies a light emitting control signal EM. In FIG. 2, a pixel P including two scan signal lines SCL1 and SCL2 to which two scan signals Scan1(*n*) and Scan2(*n*) are supplied, and two light emitting control signal lines EML1 and EML2 to which two light emitting control signals EM(n−2) and EM(n) is illustrated.

The pixel driving circuit may include a switching transistor T1, a first light emitting transistor T5, a driving transistor T2, a second light emitting transistor T4, a scan transistor T3, an initialization transistor T6, and a storage capacitor Cst, as illustrated in FIG. 2.

The switching transistor T1 is connected between the data line DL provided in the light emitting display panel 100 and a first node N1 and is driven by the second scan signal Scan2(*n*) supplied through the second scan signal line SCL2. That is, a gate of the switching transistor T1 is connected to the second scan signal line SCL2, a first electrode of the switching transistor T1 is connected to the data line DL, and a second electrode of the switching transistor T1 is connected to the first node N1.

The first light emitting transistor T5 is connected between an anode of the light emitting device ED and the first node N1 and is driven by the first light emitting control signal EM(n−2) supplied through the first light emitting control signal line EML1. That is, a first electrode of the first light emitting transistor T5 is connected to the first node N1, a second electrode of the first light emitting transistor T5 is connected to the anode of the light emitting device ED, and a gate of the first light emitting transistor T5 is connected to the first light emitting control signal line EML1. Hereinafter, a node between the anode and the second electrode of the first light emitting transistor T5 is referred to as a second node N2. Accordingly, the first light emitting transistor T5 is connected between the first node N1 and the second node N2.

Here, the first light emitting control signal EM(n−2) supplied to the first light emitting control signal line EML1 may be the same signal as the second light emitting control signal supplied to the second emission transistor T4 of the pixel P connected to the n−2th gate line. That is, in FIG. 2, the second light emitting control signal EM(n) may be supplied to the second emission transistor T4 of the pixel P connected to the nth gate line GL, and the first light emitting control signal EM(n−2) may be supplied to the first light emitting transistor T5 of the pixel P illustrated in FIG. 2.

The driving transistor T2 performs a function of controlling the magnitude (or size) of the current supplied to the light emitting device ED. To this end, the first voltage EVDD is supplied to a first electrode of the driving transistor T2, a second electrode of the driving transistor T2 is connected to the first node N1, and a gate of the driving transistor T2 is connected to a first electrode of the scan transistor T3 and a first electrode of the storage capacitor Cst.

A first electrode of the second light emitting transistor T4 is connected to a first voltage line 11 supplied with the first voltage EVDD, a second electrode of the second light emitting transistor T4 is connected to the first electrode of the driving transistor T2, and a gate of the second light emitting transistor T4 is connected to the second light emitting control signal line EML2 supplied with the second light emitting control signal EM(n).

A first electrode of the scan transistor T3 is connected to the gate of the driving transistor T2, a second electrode of the scan transistor T3 is connected to the first electrode of the driving transistor T2, and a gate of the scan transistor T3 is connected to the first scan signal line SCL1 to which the first scan signal Scan1(*n*) is supplied. That is, the scan transistor T3 is driven by the first scan signal Scan1(*n*).

A first electrode of the initialization transistor T6 is connected to the anode of the light emitting device ED, a second electrode of the initialization transistor T6 is connected to an initialization line IL supplied with the initialization voltage Vini or the compensation voltage Var, and a gate of the initialization transistor T6 is connected to the gate of the first light emitting transistor T5. The initialization line IL may be one of power lines VL. The first light emitting control signal EM(n−2) is supplied to the gate of the initialization transistor T6. That is, the initialization voltage Vini or the compensation voltage Var may be supplied to the second electrode of the initialization transistor T6. For example, in the refresh period to be described below, the initialization voltage Vini supplied to the second electrode of the initialization transistor T6 may be supplied to the anode of the light emitting device ED through the initialization transistor T6, and in the anode reset period to be described below, the compensation voltage Var supplied to the second electrode of the initialization transistor T6 may be supplied to the anode of the light emitting device ED through the initialization transistor T6. The initialization voltage Vini and the compensation voltage Var may be different voltages.

The storage capacitor Cst is connected between the gate of the driving transistor T2 and the anode of the light emitting device ED. That is, a first electrode of the storage capacitor Cst is connected to the gate of the driving transistor T2 and the first electrode of the scan transistor T3, and a second electrode of the storage capacitor Cst is connected to the first electrode of the initialization transistor T6, the second electrode of the first light emitting transistor T5, and the anode of the light emitting device ED. The storage capacitor Cst may store the data voltage Vdata and a threshold voltage of the driving transistor T2.

Each of the transistors configuring the pixel driving circuit may be a P-type thin film transistor or an N-type thin film transistor. For example, as illustrated in FIG. 2, the first light emitting transistor T5 and the second light emitting transistor T4 may be P-type thin film transistors, and the remaining transistors T1 to T3 and T6 may be N-type thin film transistors.

Moreover, each of the transistors configuring the pixel driving circuit may be an oxide thin film transistor or a thin film transistor using low temperature poly-silicon (LTPS) (hereinafter, simply referred to as a low temperature polysilicon thin film transistor or a polycrystalline thin film transistor).

The oxide thin film transistor means a transistor using an oxide semiconductor, and the polycrystalline thin film transistor means a transistor using a polycrystalline transistor.

Particularly, in the light emitting display apparatus according to the present disclosure, the driving transistor T2 and the scan transistor T3 may be oxide thin film transistors using an oxide semiconductor, and the remaining transistors T1 and T4 to T6 may be low temperature polysilicon thin film transistors using a polycrystalline semiconductor. For example, the oxide thin film transistor is slower than the low temperature polysilicon thin film transistor in the speed, but the leakage current of the oxide thin film transistor is smaller than that of the low temperature polysilicon thin film transistors. That is, the turn-on and turn-off speeds of the oxide thin film transistor are smaller than the turn-on and turn-off speeds of the low temperature polysilicon thin film transistor, but the leakage current of the oxide thin film transistor is smaller. Therefore, the switching characteristics of the oxide thin film transistor may be superior to that of the low temperature polysilicon thin film transistor.

However, the types and the kinds of transistors may be variously changed in addition to the examples described above.

The light emitting device ED may include an anode and a cathode. The anode of the light emitting device ED may be connected to the second electrode of the first light emitting transistor T5, and the cathode of the light emitting device ED may be connected to the second voltage line 12 to which the second voltage EVSS is supplied.

The structure of the pixel P applied to the present disclosure is not limited to the structure illustrated in FIG. 2. Accordingly, the structure of the pixel P may be changed in various forms. However, hereinafter, for convenience of description, a light emitting display apparatus including the pixel P illustrated in FIG. 2 is described as an example of a light emitting display apparatus according to the present disclosure.

Figure 3:
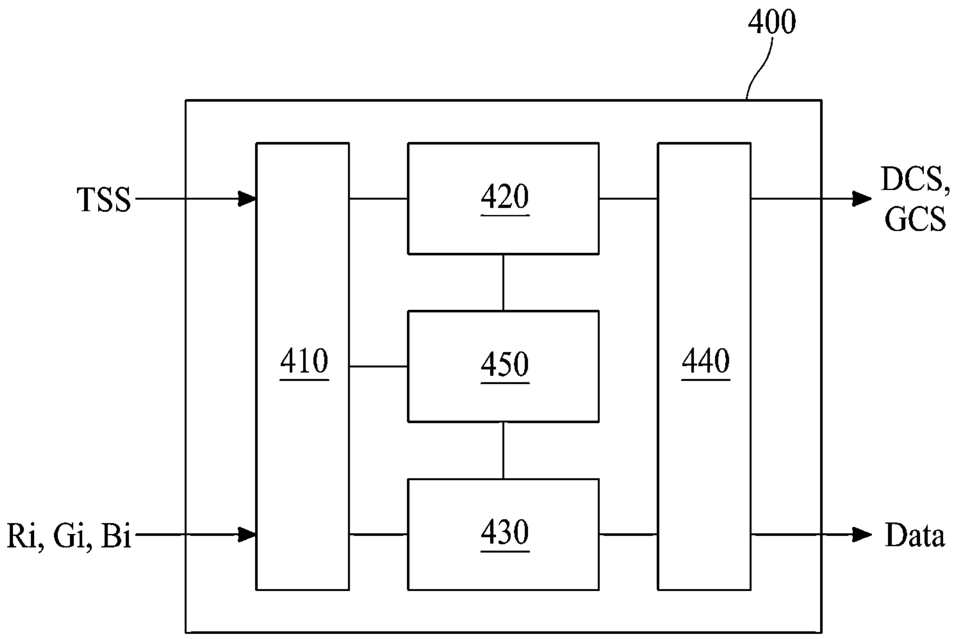
FIG. 3 is an exemplary diagram illustrating a structure of a control driver applied to a light emitting display apparatus according to an embodiment of the present disclosure.
Figure 4:
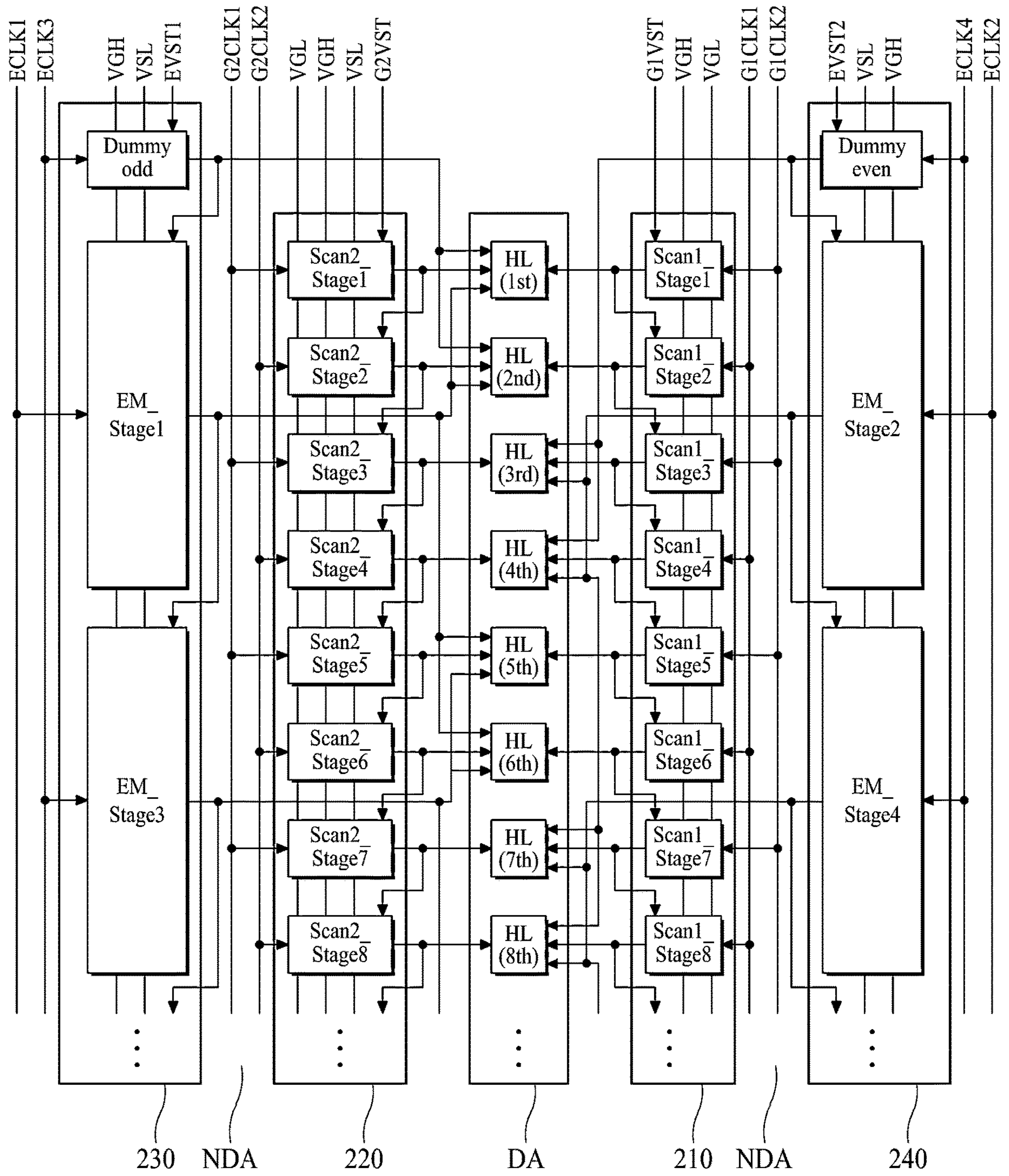
FIG. 4 is an exemplary diagram illustrating a structure of a gate driver applied to a light emitting display apparatus according to an embodiment of the present disclosure.

FIG. 3 is an exemplary diagram illustrating a structure of a control driver applied to a light emitting display apparatus according to an embodiment of the present disclosure and FIG. 4 is an exemplary diagram illustrating a structure of a gate driver applied to a light emitting display apparatus according to an embodiment of the present disclosure.

The light emitting display apparatus according to the present disclosure may be used as various electronic devices. The electronic devices may include, for example, television and monitor.

The light emitting display apparatus according to the present disclosure may include a light emitting display panel 100 which includes a display area DA displaying an image and a non-display area NDA provided outside the display area DA, a gate driver 200 which supplies gate signals to the plurality of gate lines GL provided in the display area DA of the light emitting display panel 100, a data driver 300 which supplies data voltages Vdata to the plurality of data lines DL provided in the light emitting display panel 100, a control driver 400 which controls the driving of the gate driver 200 and the data driver 300, and a power supply 500 which supplies power to the control driver 400, the gate driver 200, the data driver 300, and the light emitting display panel 100.

The control driver 400 may realign input image data Ri, Gi, and Bi, which transmitted from an external system, by using a timing synchronization signal transmitted from the external system. The control driver 400 may generate a data control signal DCS to be supplied to the data driver 300 and a gate control signal GCS to be supplied to the gate driver 200.

To this end, as illustrated in FIG. 3, the control driver 400 may include a data aligner 430 which realigns input image data Ri, Gi, and Bi to generate image data Data and supplies the image data Data to the data driver 300, a control signal generator 420 which generates the gate control signal GCS and the data control signal DCS by using the timing synchronization signal, a control unit 410 which receives the timing synchronization signal and the input image data transferred from the external system, transfers the timing synchronization signal to the control signal generator, and transfers the input image data to the data aligner, and an output unit 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 may generate a power control signal supplied to the power supply 500.

The control driver 400 may further include a storage unit 450 for storing various information. The storage unit 450 may be included in the control driver 400, but may be separated from the control driver 400 and provided independently.

The external system may perform a function of driving the control driver 400 and an electronic device.

For example, when the electronic device is a television (TV), the external system may receive various kinds of sound information, image information, and letter information over a communication network and may transmit the received image information to the control driver 400.

Moreover, when the electronic device is a monitor, the external system may receive image information over a communication network connected to a computer, convert the received image information into input image data Ri, Gi, and Bi, and transmit it to the control driver 400.

That is, the external system may change the image information received through the communication network into a signal recognized by the control driver 400. In this case, the signals recognized by the control driver 400 may be input image data Ri, Gi, and Bi. That is, the external system may convert image information into input image data Ri, Gi, and Bi, and the input image data Ri, Gi, and Bi may be transmitted to the control driver 400.

The power supply 500 may generate various powers and supply the generated powers to the control driver 400, the gate driver 200, the data driver 300, and the light emitting display panel 100.

Particularly, the power supply 500 may supply the initialization voltage Vini to the initialization line IL during the refresh period, and may supply the compensation voltage Var to the initialization line IL during the anode reset period.

That is, the power supply 500 may supply the initialization voltage Vini or the compensation voltage Var to the initialization line IL based on a control signal transmitted from the control driver 400.

The data driver 300 may supply data voltages Vdata to the data lines DL.

To this end, the data driver 300 may include a shift register which outputs the sampling signal, a latch portion which latches image data Data received from the control driver 400, a digital-to-analog converter which converts the image data Data, transferred from the latch portion 320, into a data voltage Vdata and outputs the data voltage Vdata, and an output buffer which outputs the data voltage, transferred from the digital-to-analog converter, to the data line DL on the basis of a source output enable signal.

The gate driver 200 may be directly embedded into the non-display area NDA by using a gate-in panel (GIP) type. Moreover, the gate driver 200 may be provided in the display area DA in which light emitting devices ED are provided or may be provided on a chip-on film mounted in the non-display area NDA.

The gate driver 200 may supplies a gate signal to each of the gate lines GL. As described above, the gate signal may include a scan signal Scan and a light emitting control signal EM. The scan signal Scan performs the function of supplying the data voltage Vdata to the pixel P, and the light emitting control signal EM may control the timing at which the light emitting device ED emits light. In FIG. 2, a pixel P to which two scan signals Scan1(*n*) and Scan2(*n*) and two light emitting control signals EM(n−2) and EM(n) are supplied is illustrated. To this end, two scan signal lines SCL1 and SCL2 and two light emitting control signal lines EML1 and EML2 are connected to the pixels illustrated in FIG. 2.

An example of a gate driver 200 for generating two scan signals Scan1(*n*) and Scan2(*n*), and two light emitting control signals EM(n−2) and EM(n) is illustrated in FIG. 4.

Particularly, the gate driver 200 illustrated in FIG. 4 includes a first scan signal generator 210, a second scan signal generator 220, an odd light emitting control signal generator 230, and an even light emitting control signal generator 240, which are provided in the non-display area NDA on both sides of the display area DA.

The first scan signal generator 210 generates first scan signals Scan1 and sequentially supplies the first scan signals Scan1 to horizontal lines HL provided in the display area DA. To this end, the first scan signal generator 210 includes first scan signal stages Scan1_Stage.

Each of the first scan signal stages Scan1_Stage generates a first scan signal Scan1 and supplies it to the first scan signal line SCL1.

That is, each of the first scan signal stages Scan1_Stage supplies the first scan signal Scan1 to one horizontal line HL through the first scan signal line SCL1 connected to one horizontal line HL.

Here, the horizontal line HL means a virtual line with pixels connected to the first scan signal line SCL1 to which the first scan signal Scan1 is supplied. For example, a first scan signal line SCL1, a second scan signal line SCL2, a first light emitting control signal line EML1, a second light emitting control signal line EML2, and pixels P are provided in the first horizontal line HL(1st). Pixels P provided in the first horizontal line HL(1st) are connected to the first scan signal line SCL1, the second scan signal line SCL2, the first light emitting control signal line EML1, and the second light emitting control signal line EML2.

A first scan signal generator start signal G1VST, a gate first voltage VGH, a gate second low voltage VGL, and first gate clocks G1CLK1 and G1CLK2 may be supplied to the first scan signal generator 210. These signals may be supplied from the control driver 400 or the power supply 500.

For example, among first scan signal stages Scan1_Stage provided in the first scan signal generator 210, a first stage Scan1_Stage1 may be driven by a first scan signal generator start signal G1VST transmitted from the control driver 400. Each of the remaining stages (Scan1_Stage2, Scan1_Stage3, . . . ) may be driven using a signal supplied from a previous stage as a start signal. Here, the previous stage may be a stage adjacent to the currently driven stage, but may be a stage spaced apart from the currently driven stage with at least one other stage therebetween.

The gate first voltage VGH and the gate second voltage VGL may be supplied from the power supply 500.

The gate first voltage VGH and the gate second voltage VGL may turn on or off a pull-up transistor or a pull-down transistor provided in the first scan signal stage Scan1_Stage. Here, the pull-up transistor means, for example, a transistor which supplies a signal capable of turning on the switching transistor T1, and the pull-down transistor means a transistor which supplies a signal capable of turning off the switching transistor T1. That is, the pull-up transistor or the pull-down transistor may be turned on or off by the gate first voltage VGH and the gate second voltage VGL, and thus, the switching transistor T1 may be turned on or off.

The second scan signal generator 220 generates second scan signals Scan2 and sequentially supplies the second scan signals Scan2 to horizontal lines HL provided in the display area DA. To this end, the second scan signal generator 220 includes second scan signal stages Scan2_Stage.

Each of the second scan signal stages Scan2_Stage generates a second scan signal Scan2 and supplies it to the second scan signal line SCL2.

That is, each of the second scan signal stages Scan2_Stage supplies the second scan signal Scan2 to one horizontal line HL through the second scan signal line SCL2 connected to one horizontal line HL.

A second scan signal generator start signal G2VST, a gate first voltage VGH, a gate second voltage VGL, a gate third voltage VSL, and second gate clocks G2CLK1 and G2CLK2 may be supplied to the second scan signal generator 220. These signals may be supplied from the control driver 400 or the power supply 500.

For example, among second scan signal stages Scan2_Stage provided in the second scan signal generator 220, a first stage Scan2_Stage1 may be driven by the second scan signal generator start signal G2VST transmitted from the control driver 400. The remaining stages (Scan2_Stage2, Scan2_Stage3, . . . ) may be driven using a signal supplied from a previous stage as a start signal. Here, the previous stage may be a stage adjacent to the currently driven stage, but may be a stage spaced apart from the currently driven stage with at least one other stage therebetween.

The gate first voltage VGH and the gate second voltage VGL may be supplied from the power supply 500. The gate first voltage VGH and the gate second voltage VGL may turn on or off a pull-up transistor or a pull-down transistor provided in the second scan signal stage Scan2_Stage. Here, the pull-up transistor means, for example, a transistor which supplies a signal capable of turning on the switching transistor T1, and the pull-down transistor means a transistor which supplies a signal capable of turning off the switching transistor T1. That is, the pull-up transistor or the pull-down transistor may be turned on or off by the gate first voltage VGH and the gate second voltage VGL, and thus, the switching transistor T1 may be turned on or off. The gate third voltage VSL may also control the turning on and off of at least one of the transistors provided in the second scan signal stage Scan2_Stage.

The odd light emitting control signal generator 230 and the even light emitting control signal generator 240 supply light emitting control signals. The light emitting control signals supplied from the odd light emitting control signal generator 230 and the even light emitting control signal generator 240 may be the first light emitting control signal EM(n−2) and the second light emitting control signal EM(n) described with reference to FIG. 2.

In order to generate the light emitting control signals, the odd emitting control signal generator 230 includes an odd dummy stage EM Dummy odd and an odd light emitting control signal stages (EM_Stage1, EM_Stage3, . . . ). The even light emitting control signal generator 240 includes an even dummy stage EM Dummy even and even light emitting control signal stages (EM_Stage2, EM_Stage4, . . . ).

An odd light emitting control signal generator start signal EVST1, the gate first voltage VGH, the gate second voltage VGL, and odd light emission clocks ECLK1 and ECLK3 may be supplied to the odd light emitting control signal generator 230. An even light emitting control signal generator start signal EVST2, the gate first voltage VGH, the gate second voltage VGL, and even light emission clocks ECLK2 and ECLK4 may be supplied to the even light emitting control signal generator 240. These signals may be supplied from the control driver 400 or the power supply 500.

For example, the odd dummy stage Dummy odd provided in the odd light emitting control signal generator 230 may be driven by the odd light emitting control signal generator start signal EVST1 transmitted from the control driver 400. In this case, the odd light emitting control signal stages (EM_Stage1, EM_Stage3, . . . ) provided in the odd light emitting control signal generator 230 may be driven using a signal supplied from a previous stage as a start signal. Here, the previous stage may be a stage adjacent to the currently driven stage, but may be a stage spaced apart from the currently driven stage with at least one other stage therebetween.

The gate first voltage VGH and the gate second voltage VGL may be supplied from the power supply 500. The gate first voltage VGH and the gate second voltage VGL may control the turning on and off of the transistors provided in the odd dummy stage Dummy odd and the odd light emitting control signal stages (EM_Stage1, EM_Stage3, . . . ).

The Odd light emission clocks ECLK1 and ECLK3 are supplied to the odd light emitting control signal stages (EM_Stage1, EM_Stage3, . . . ), and can be used to generate the light emitting control signal EM.

Each of the odd light emitting control signal stages (EM_Stage1, EM_Stage3, . . . ) may correspond to four second scan signal stages Scan2_Stage. Also, each of the odd light emitting control signal stages (EM_Stage1, EM_Stage3, . . . ) may supply the light emitting control signal EM to the four horizontal lines HL.

For example, the even dummy stage Dummy even provided in the even light emitting control signal generator 240 may be driven by the even light emitting control signal generator start signal EVST2 transmitted from the control driver 400. In this case, the even light emitting control signal stages (EM_Stage2, EM_Stage4, . . . ) provided in the even light emitting control signal generator 240 may be driven by a signal supplied from a previous stage as a start signal. Here, the previous stage may be a stage adjacent to the currently driven stage, but may be a stage spaced apart from the currently driven stage with at least one other stage therebetween.

The gate first voltage VGH and the gate second voltage VGL may be supplied from the power supply 500. The gate first voltage VGH and the gate second voltage VGL may control the turning on and turning off of the transistors provided in the even dummy stage Dummy even and the even light emitting control signal stages (EM_Stage2, EM_Stage4, . . . ).

The even light emission clocks ECLK2 and ECLK4 are supplied to the even light emitting control signal stages (EM_Stage2, EM_Stage4, . . . ), and can be used to generate the light emitting control signal EM.

Each of the even light emitting control signal stages (EM_Stage2, EM_Stage4, . . . ) may correspond to four first scan signal stages Scan1_Stage. Also, each of the even light emitting control signal stages (EM_Stage2, EM_Stage4, . . . ) may supply the light emitting control signal EM to four horizontal lines HL.

As illustrated in FIG. 4, the first scan signal generator 210 and the second scan signal generator 220 may be provided in two non-display areas NDA facing each other with the display area DA therebetween to face each other.

In this case, the second scan signal generator 220 may be provided between the odd light emitting control signal generator 230 and the display area DA, and the first scan signal generator 210 may be provided between the even light emitting control signal generator 240 and the display area DA.

That is, in the non-display area NDA to be described with reference to FIG. 12, a distance between the first scan signal generator 210 and a dam DAM may be closer than a distance between the even light emitting control signal generator 240 and the dam DAM. Also, in the non-display area NDA to be described with reference to FIG. 12, a distance between the second scan signal generator 220 and a dam DAM may be closer than a distance between the odd light emitting control signal generator 230 and the dam DAM.

However, the odd light emitting control signal generator 230 and the even light emitting control signal generator 240 may be provided in two non-display areas NDA facing each other with the display area DA therebetween to face each other.

In this case, the odd emitting control signal generator 230 may be provided between the second scan signal generator 220 and the display area DA, and the even emitting control signal generator 240 may be provided between the first scan signal generator 210 and the display area DA.

That is, in the non-display area NDA to be described with reference to FIG. 12, a distance between the even light emitting control signal generator 240 and a dam DAM may be closer than a distance between the first scan signal generator 210 and the dam DAM. Also, in the non-display area NDA to be described with reference to FIG. 12, a distance between the odd light emitting control signal generator 230 and a dam DAM may be closer than a distance between the second scan signal generator 220 and the dam DAM.

However, the first scan signal generator 210, the second scan signal generator 220, the odd light emitting control signal generator 230, and the even light emitting control signal generator 240 may be provided in the non-display area NDA in various arrangement structures in addition to the arrangement structure described above.

Moreover, the structure of the gate driver 200 applied to the present disclosure is not limited to the structure illustrated in FIG. 4. Accordingly, the structure of the gate driver 200 may be changed in various forms.

Figure 5:
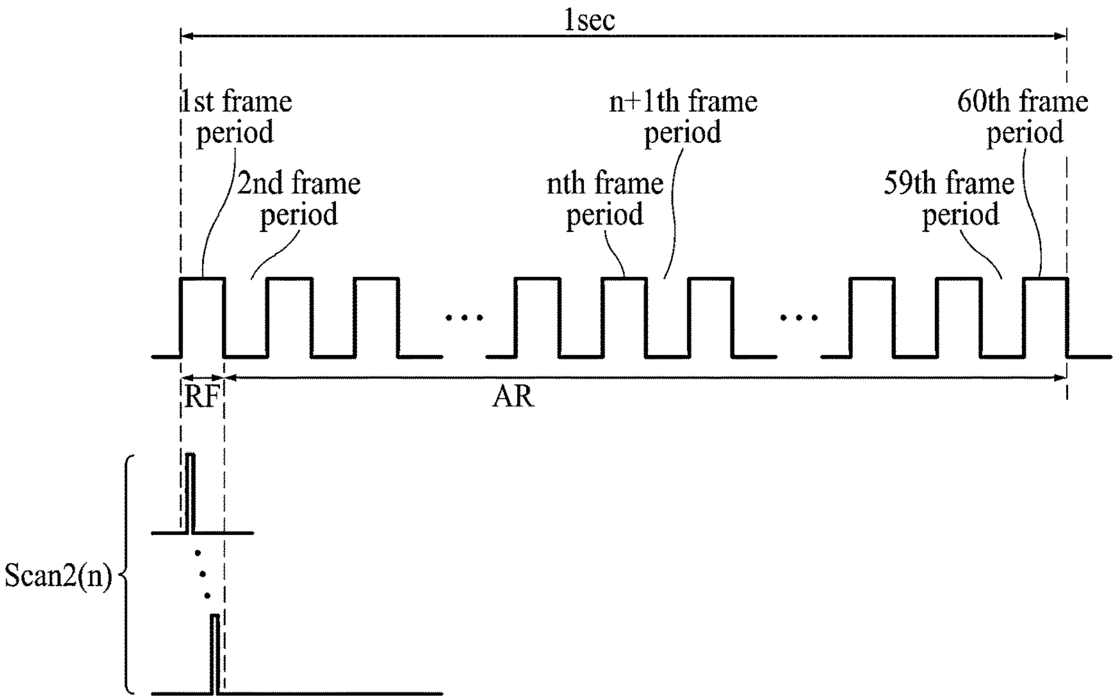
FIG. 5 is an exemplary diagram for describing a method of driving a light emitting display apparatus according to an embodiment of the present disclosure.

FIG. 5 is an exemplary diagram for describing a method of driving a light emitting display apparatus according to an embodiment of the present disclosure. In the following description, descriptions which are the same as or similar to descriptions given above with reference to FIGS. 1 to 4 are omitted or will be briefly given.

As described above, the light emitting display apparatus according to the present disclosure includes the light emitting display panel 100 provided with the pixel P, the gate driver 200 supplying gate signals to the pixel driving circuit, the data driver 300, the control driver 400, and the power supply 500.

The pixel driving circuit includes a switching transistor T1, a driving transistor T2, and a first light emitting transistor T5, and the first light emitting transistor T5 is connected between the anode of the light emitting device ED and the first node N1. The switching transistor T1 is connected between the data line DL provided in the light emitting display panel 100 and the first node N1. The driving transistor T2 may control the size (or magnitude) of the current supplied to the light emitting device ED through the first node N1 and the first light emitting transistor T5. The driving transistor may be formed of an oxide semiconductor.

As an example, during the use of the light emitting display apparatus, the gate driver may turn on the first light emitting transistor M times per second (M is a natural number of 2 or more) and turn on the switching transistor T1 once per second.

In this case, one second may be divided into a refresh period RF and an anode reset period AR. The anode reset period AR may be set to be longer than the refresh period RF.

Accordingly, the gate driver 200 may turn on the first light emitting transistor T5 M times per second, and the gate driver 200 may turn on the switching transistor T1 once only in the refresh period RF.

That is, the first light emitting transistor T5 may be turned on once in the refresh period RF, may be turned on M−1 (M is a natural number of 2 or more) times in the anode reset period AR, and the switching transistor T1 may be turned on once only in the refresh period RF.

For example, when 1 second is divided into 60 frame periods, as illustrated in FIG. 5, in the first frame period, the second scan signals Scan2(*n*) are sequentially supplied to the second scan signal lines SCL2, and thus, one image may be displayed in the light emitting display panel 100. That is, in the first frame period, data voltages Vdata may be supplied to the data lines DL, and thus, one image may be displayed. The first frame period may be a refresh period RF.

In the remaining 59 frame periods (2nd frame period to 60th frame period), the first light emitting transistor T5 is repeatedly turned on and off. Particularly, the first light emitting transistor T5 may be turned on once in each of the remaining 59 frame periods, and thus, light can be output from the light emitting device. The remaining 59 frame periods are referred to as anode reset periods AR. That is, the remaining periods excluding the refresh period RF among the periods of 1 second are referred to as anode reset periods AR.

The light emitting device can output light using the data voltage charged to the driving transistor T2 during the refresh period, and also can output light using the data voltage charged (in other words, stored) in the driving transistor T2 during the anode reset period. Accordingly, even in the second frame period to the 60th frame period, the same images as that output in the refresh period RF may be displayed.

Figure 7A:
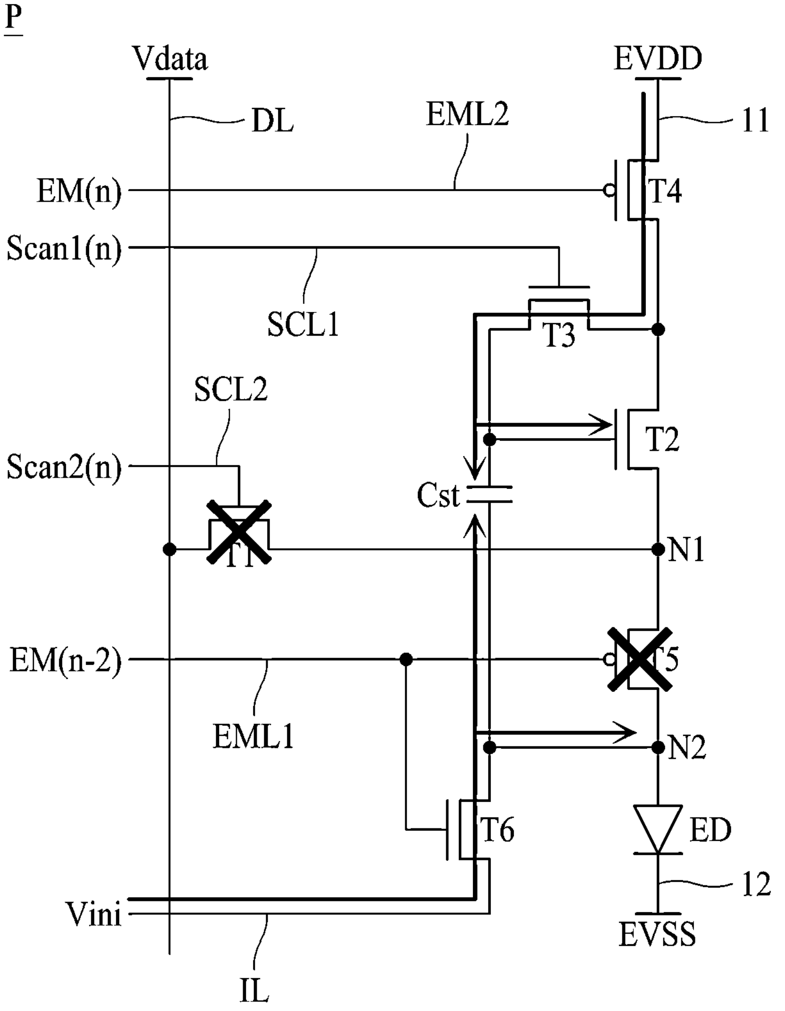
FIGS. 7A to 7D are exemplary diagrams for describing a method of driving a refresh period of a light emitting display apparatus according to an embodiment of the present disclosure.
Figure 7B:
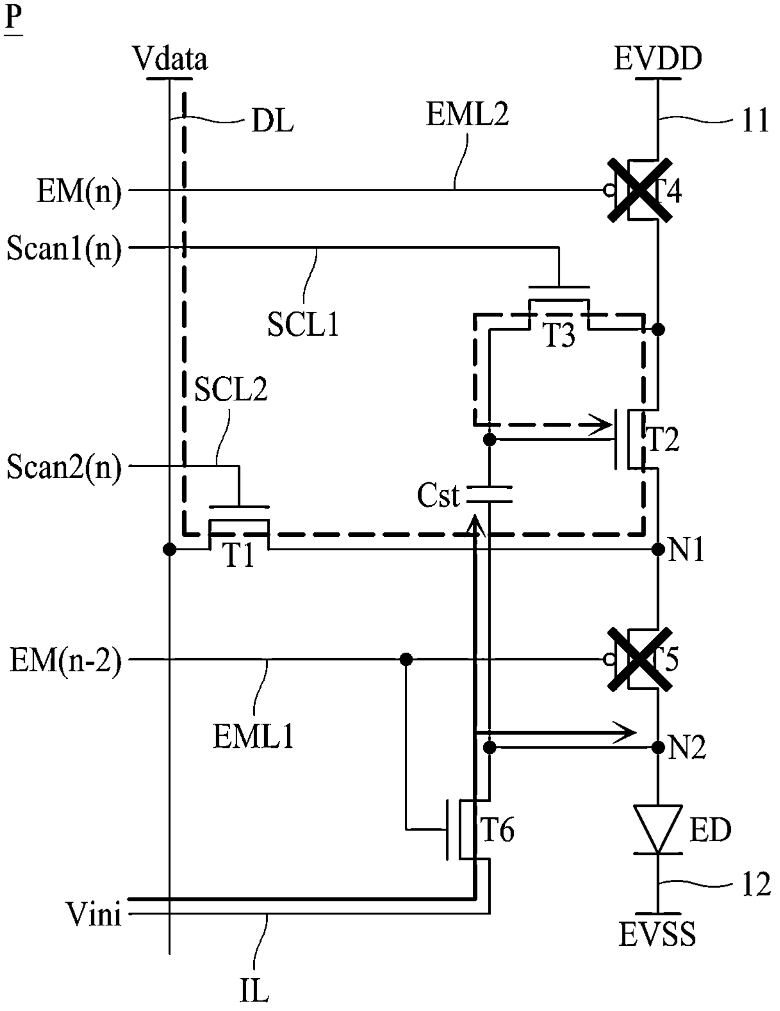

That is, during the refresh period RF, a data voltage Vdata may be supplied to the gate of the driving transistor through the data line DL, the switching transistor T1, and the first node N1 (as shown in FIG. 7B), and light may be output from the light emitting device ED on the basis of the size (or magnitude) of the data voltage Vdata. In the anode reset period AR, the data voltage Vdata supplied during the refresh period RF is used, and the first light emitting transistor T5 is repeatedly turned on and off, and thus, light may be output from the light emitting device.

In this case, the switching transistor T1 is turned on once only in the refresh period RF, and is not turned on during the anode reset period.

Because the gate of the initialization transistor T6 is connected to the gate of the first light emitting transistor T5, the initialization transistor T6 is an N-type transistor, and the first light emitting transistor T5 is a P-type transistor, the initialization transistor T6 may be turned off when the first light emitting transistor T5 is turned on, and may be turned on when the first light emitting transistor T5 is turned off.

That is, because the first light emitting transistor T5 is turned on and off during each frame period of the anode reset period AR, the initialization transistor T6 may be turned on not only during the refresh period RF but also during the anode reset period AR.

To provide an additional description, the initialization transistor T6 may be turned on when the first light emitting transistor T5 is turned off, not only during the refresh period but also during the anode reset period AR.

When the initialization transistor T6 is turned on during the anode reset period AR, a compensation voltage Var may be supplied to the anode of the light emitting device ED through the initialization transistor T6.

In this case, the compensation voltage Var may be a voltage different from the initialization voltage Vini supplied to the anode of the light emitting device ED through the initialization transistor T6 in the refresh period RF.

The compensation voltage Var may be set to a voltage which does not affect the luminance of light generated in the light emitting device ED.

For example, in the anode reset period AR, the initialization transistor T6 is turned on and the compensation voltage Var is supplied to the second node N2, and thus, the compensation voltage Var may be supplied to the anode of the light emitting device. However, in this case, a current is not supplied to the light emitting device ED because the first light emitting transistor T5 is turned off. Accordingly, even when the compensation voltage Var is supplied to the second node N2, light is not output from the light emitting device ED.

However, when the first light emitting transistor T5 and the second light emitting transistor T4 are turned on, a current is supplied to the light emitting device ED through the second node N2. Accordingly, the luminance of light output from the light emitting device ED may be affected by the compensation voltage Var applied to the second node N2 just before the light emitting device ED outputs light.

To prevent this, the compensation voltage Var can be calculated through various tests and simulations during the manufacturing process of the light emitting display apparatus, and particularly, can be set to a value that does not affect the luminance of light output from the light emitting device ED or a value that has a minimal effect on the luminance of light output from the light emitting device ED.

For example, in a test or simulation, after each of the data voltages Vdata corresponding to all gradations (or grays) is applied to the pixel, compensation voltages Var of various sizes (or magnitudes) may be applied to the pixel. By this test or simulation, a compensation voltage Var that generates the luminance same as or similar to the luminance corresponding to each of all gradations can be set.

That is, the compensation voltage Var can be set through various tests and simulations, and the compensation voltage Var can be supplied through data lines DL during the anode reset period AR.

As an example, the first light emitting transistor T5 is turned on once during the refresh period RF, and is turned on M−1 times during the anode reset period AR.

That is, when the first light emitting transistor T5 is turned on during the refresh period RF, a current may be supplied to the light emitting device ED through the driving transistor T2, and thus, light may be output from the light emitting device ED.

In this case, the data voltage Vdata supplied through the data line DL during the refresh period RF can be stored in the storage capacitor Cst connected to the gate of the driving transistor T2, and thus, the driving transistor T2 may transmit a current corresponding to the data voltage Vdata stored in the storage capacitor Cst to the light emitting device ED even in the anode reset period AR. Therefore, the luminance of light output from the light emitting device ED during the anode reset period AR may be the same as the luminance of light output from the light emitting device ED during the refresh period RF. Accordingly, in the light emitting display panel 100, one image can be continuously displayed during the refresh period RF and the anode reset period AR.

Moreover, to prevent leakage of the data voltage Vdata stored in the driving transistor T2, the scan transistor T3 and the driving transistor T2 can be oxide thin film transistors with a small off-leakage current.

Figure 6:
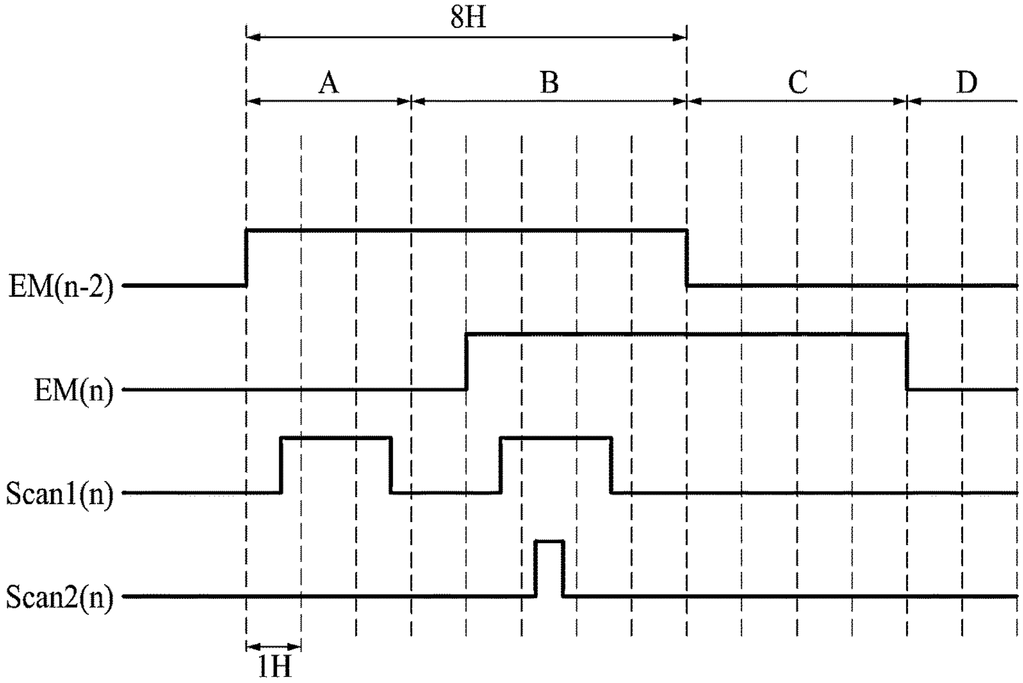
FIG. 6 is a timing diagram for describing a method of driving a refresh period of a light emitting display apparatus according to an embodiment of the present disclosure.

FIG. 6 is a timing diagram for describing a method of driving a refresh period of a light emitting display apparatus according to an embodiment of the present disclosure, and FIGS. 7A to 7D are exemplary diagrams for describing a method of driving a refresh period of a light emitting display apparatus according to an embodiment of the present disclosure. In the following description, descriptions which are the same as or similar to descriptions given above with reference to FIGS. 1 to 5 are omitted or will be briefly described.

First, in an initialization period A during the refresh period RF, as illustrated in FIG. 6, a high-level first light emitting control signal EM(n−2), a low-level second light emitting control signal EM(n), a high-level first scan signal Scan1(*n*), and a low-level second scan signal Scan2(*n*) are supplied to the pixel P.

Accordingly, as illustrated in FIG. 7A, the initialization voltage Vini is supplied to the anode of the light emitting device ED, and thus, the anode of the light emitting device ED is initialized to the initialization voltage Vini.

Next, in a sampling period B, as illustrated in FIG. 6, a high-level first light emitting control signal EM(n−2), a high-level second light emitting control signal EM(n), a high-level first scan signal Scan1(*n*), and a high-level second scan signal Scan2(*n*) are supplied to the pixel P.

Accordingly, as illustrated in FIG. 7B, the data voltage Vdata is stored in the storage capacitor Cst through the switching transistor T1, the driving transistor T2, and the scan transistor T3. In this case, the voltage of the gate of the driving transistor T2 is the sum of the data voltage Vdata and the threshold voltage of the driving transistor T2.

Next, in a program period C, as illustrated in FIG. 6, a low-level first light emitting control signal EM(n−2), a high-level second light emitting control signal EM(n), a low-level first scan signal Scan1(*n*), and a low-level second scan signal Scan2(*n*) are supplied to the pixel P.

Figure 7C:
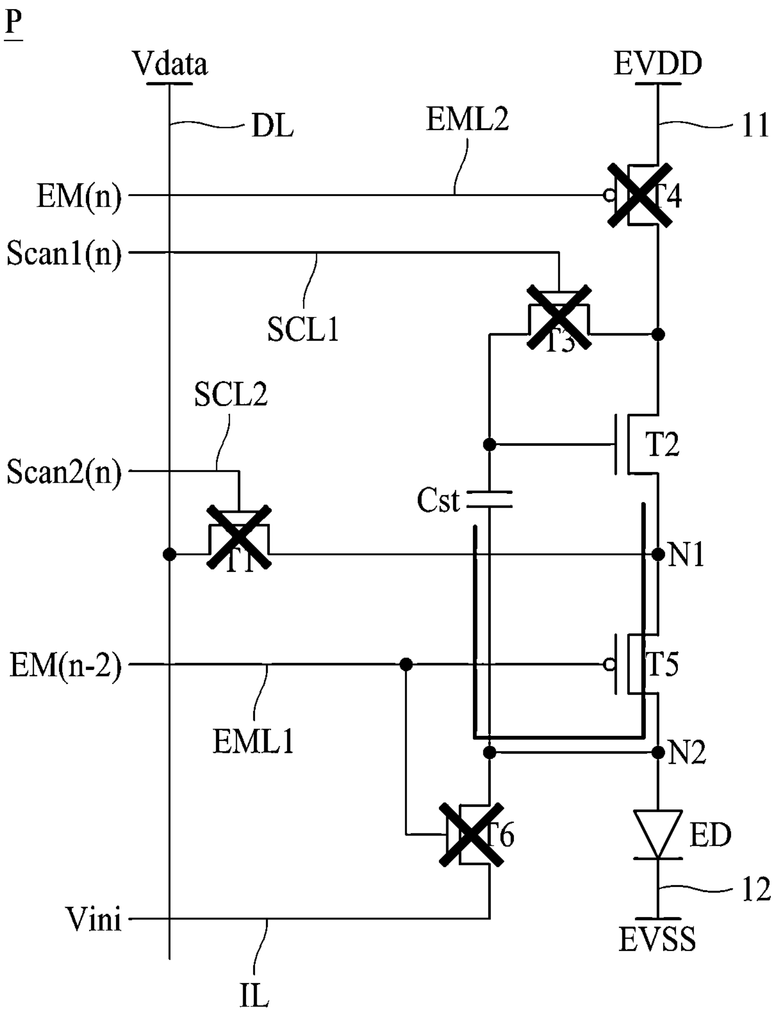

Accordingly, as illustrated in FIG. 7C, the switching transistor T1, the scan transistor T3, the second light emitting transistor T4, and the initialization transistor T6 are turned off. In this case, the voltage of the gate of the driving transistor T2 is maintained as the sum of the data voltage Vdata and the threshold voltage of the driving transistor T2 as in the sampling period B.

Finally, in a light emitting period D, as illustrated in FIG. 6, a low-level first light emitting control signal EM(n−2), a low-level second light emitting control signal EM(n), a low-level first scan signal Scan1(*n*), and a low-level second scan signal Scan2(*n*) are supplied to the pixel P.

Figure 7D:
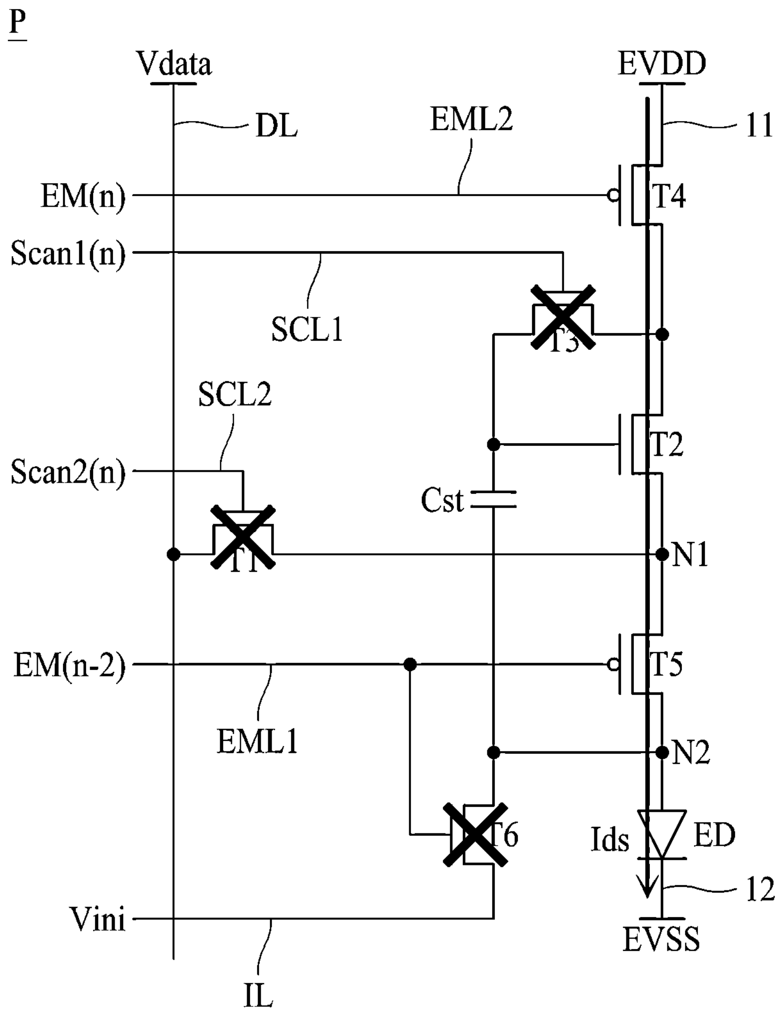

Accordingly, as illustrated in FIG. 7D, the first light emitting transistor T5 and the second light emitting transistor T4 are turned on, and the driving transistor T2 is also turned on at a size corresponding to the data voltage Vdata, and thus, a current corresponding to the data voltage Vdata is supplied to the light emitting device ED. Accordingly, light having a luminance corresponding to the data voltage Vdata is output from the light emitting device ED.

In this case, a gate-source voltage Vgs of the driving transistor T2 may be determined by the data voltage Vdata and the initialization voltage Vini, and is not affected by the threshold voltage of the driving transistor T2.

That is, the luminance of light output from the light emitting device ED in the light emitting period D may be determined by the size of the current Ids supplied to the light emitting device ED. The size of the current Ids supplied to the light emitting device ED is determined by the data voltage Vdata and the initialization voltage Vini as described in [Equation 1] below, and is not affected by the threshold voltage of the driving transistor T2. That is, the current Ids supplied to the light emitting device ED may be proportional to the square of the difference voltage between the data voltage Vdata and the initialization voltage Vini.

$$Ids \propto (Vdata - Vini)^2 \quad \text{[Equation 1]}$$

Therefore, even when the threshold voltage of the driving transistor T2 changes due to the continuous use of the light emitting display apparatus, the light emitting device ED can normally output light with a luminance corresponding to the data voltage Vdata.

Figure 8:
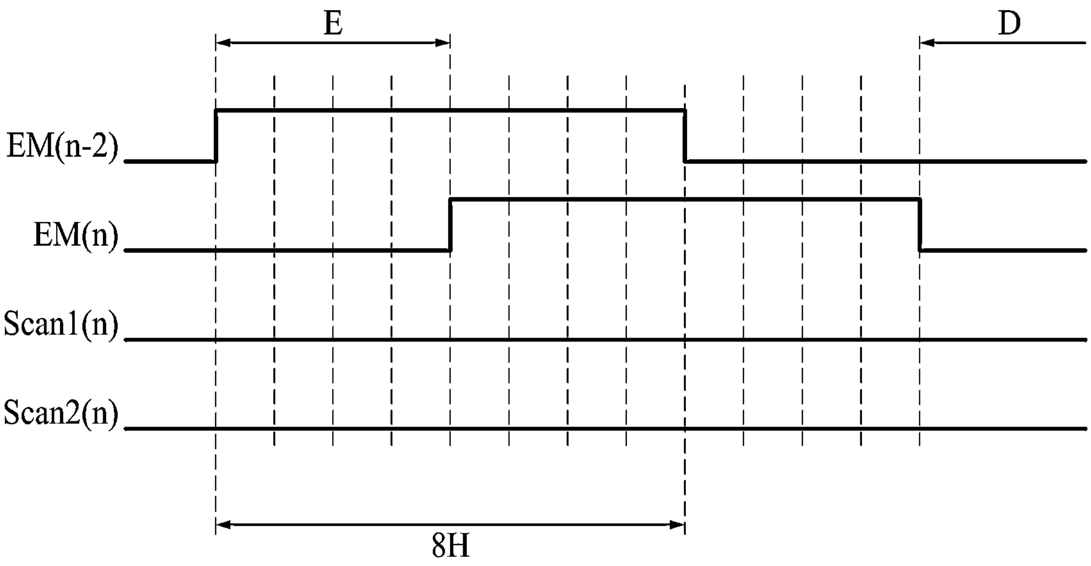
FIG. 8 is a timing diagram for describing a method of driving an anode reset period of a light emitting display apparatus according to an embodiment of the present disclosure.
Figure 9:
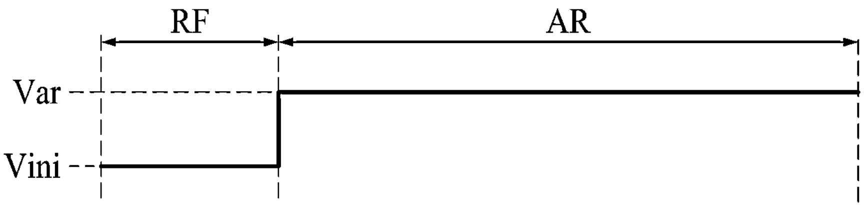
FIG. 9 is a waveform diagram illustrating an initialization voltage and a compensation voltage applied to a light emitting display apparatus according to an embodiment of the present disclosure.

FIG. 8 is a timing diagram for describing a method of driving an anode reset period of a light emitting display apparatus according to an embodiment of the present disclosure, and FIG. 9 is a waveform diagram illustrating an initialization voltage and a compensation voltage applied to a light emitting display apparatus according to an embodiment of the present disclosure. Particularly, FIG. 8 is a timing diagram in any one frame period during the anode reset period AR, and may be, for example, a timing diagram in the nth frame period illustrated in FIG. 5. In the following descriptions, details which are the same as or similar to details described with reference to FIGS. 1 to 7D are omitted or will be briefly described.

As described above with reference to FIGS. 1 to 7D, the initialization transistor T6 may be turned off when the first light emitting transistor T5 is turned on, and may be turned on when the first light emitting transistor T5 is turned off.

That is, because the first light emitting transistor T5 may be turned on and off in each frame period during the anode reset period AR, the initialization transistor T6 may be turned on not only during the refresh period RF but also during the anode reset period AR.

To provide an additional description, as described with reference to FIG. 2, the gate of the initialization transistor T6 is connected to the gate of the first light emitting transistor T5, the initialization transistor T6 is an N-type transistor, and the first light emitting transistor T5 is a P-type transistor. Accordingly, the initialization transistor T6 may be turned off when the first light emitting transistor T5 is turned on, and may be turned on when the first light emitting transistor T5 is turned off.

Therefore, a reset period E in which the compensation voltage Var is supplied to the anode of the light emitting device ED through the initialization transistor T6 and the anode of the light emitting device ED is reset may be a period in which the first light emitting control signal EM(n−2) supplied to the first light emitting transistor T5 has a high level, as illustrated in FIG. 8. That is, because the first light emitting transistor T5 is a P-type transistor, when the first light emitting control signal EM(n−2) having a high level is supplied, the first light emitting transistor T5 is turned off. Moreover, because the initialization transistor T6 is an N-type transistor, when the first light emitting control signal EM(n−2) having a high level is supplied, the initializing transistor T6 is turned on.

When the initialization transistor T6 is turned on, the compensation voltage Var supplied through the initialization line IL is supplied to the anode of the light emitting device ED through the initialization transistor T6 and the second node N2, and accordingly, the anode of the light emitting device ED may be reset to the compensation voltage Var.

As described above, the compensation voltage may be set to a voltage that has a minimum effect on the luminance of light output from the light emitting device ED, and may be set through various tests and simulations.

Also, in order to minimize the change in the characteristics of the light emitting device ED, the compensation voltage Var is supplied to the second node N2 just before the light is output from the light emitting device ED.

Accordingly, just before the light emitting device ED outputs light, the anode of the light emitting device ED can be initialized by the compensation voltage Var.

When the first light emitting control signal EM(n−2) and the second light emitting control signal EM(n) have a low level after the anode of the light emitting device ED is initialized by the compensation voltage Var, both the first light emitting transistor T5 and the second light emitting transistor T4 are turned on, so that a current corresponding to the data voltage Vdata stored in the storage capacitor Cst may flow to the light emitting device ED through the second light emitting transistor T4, the driving transistor T2, and the first light emitting transistor T5. Accordingly, even in the anode reset period AR, light having a luminance corresponding to the luminance in the refresh period RF may be output.

To provide an additional description, in the light emitting display apparatus according to the present disclosure, the initialization transistor T6 can be turned on just before light is output from the light emitting device. That is, in the reset period E where the first light emitting transistor T5 is turned off, so that light is not output from the light emitting device, the initialization transistor T6 can be turned on. Accordingly, the anode of the light emitting device ED can be initialized by the compensation voltage Var. Immediately after the anode of the light emitting device ED is initialized by the compensation voltage Var, the first light emitting transistor T5 and the second light emitting transistor T4 are turned on, and thus, light can be output from the light emitting device ED. Accordingly, the light emitting device ED may output light having a luminance corresponding to the data voltage Vdata in the anode reset period AR as in the refresh period RF.

Thus, according to the light emitting display apparatus of the present disclosure, light having the same or similar luminance may be output in the refresh period RF and the anode reset period AR, and accordingly, the image output from the light emitting display panel 100 in the refresh period RF may be continuously output in the anode reset period AR.

To this end, as illustrated in FIG. 9, the power supply 500 may supply the initialization voltage Vini to the initialization line IL during the refresh period RF, and may supply the compensation voltage Var to the initialization line IL during the anode reset period AR. In this case, the power supply 500 may supply the initialization voltage Vini or the compensation voltage Var to the initialization line IL on the basis of the power control signal supplied from the control driver 400.

In this case, the compensation voltage Var may be set to a specific value through various tests, various simulations, etc., as described above, and for example, the compensation voltage Var may be set to a value greater than the initialization voltage Vini, as illustrated in FIG. 9.

For example, when the initialization voltage Vini is 1 V, the compensation voltage Var may be 1.1 V.

Figure 10:
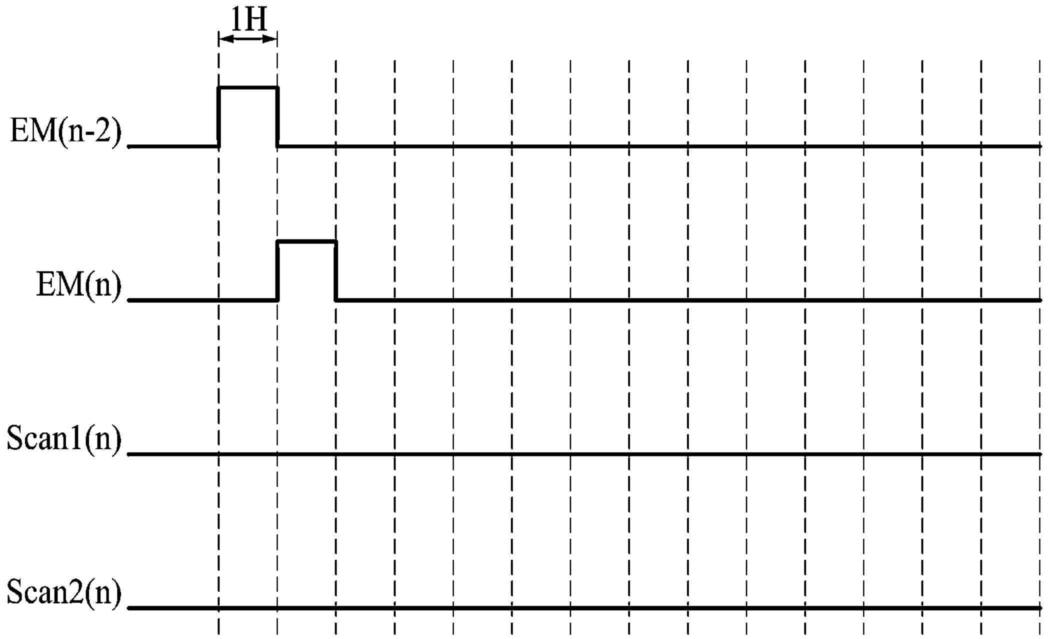
FIG. 10 is another timing diagram for describing a method of driving an anode reset period of a light emitting display apparatus according to an embodiment of the present disclosure.
Figure 11:
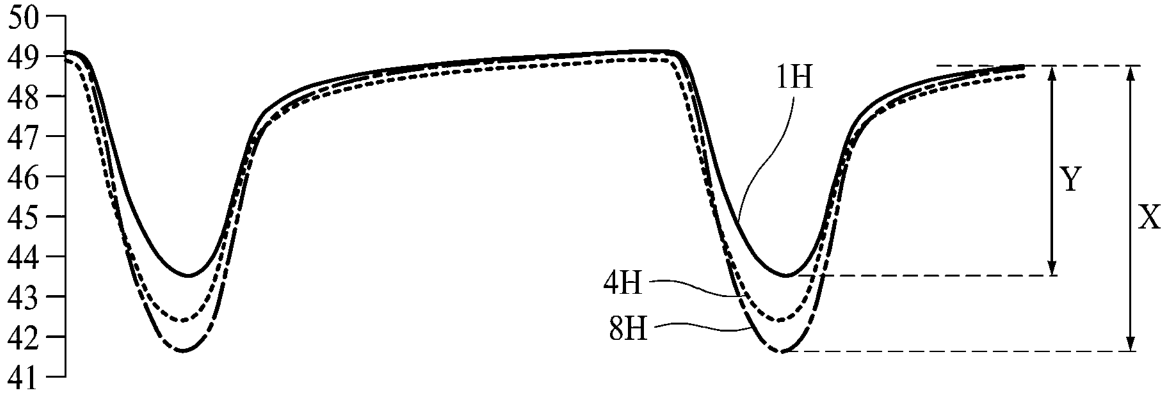
FIG. 11 is an exemplary diagram for describing features of a light emitting display apparatus according to an embodiment of the present disclosure.

FIG. 10 is another timing diagram for describing a method of driving an anode reset period of a light emitting display apparatus according to an embodiment of the present disclosure, and FIG. 11 is an exemplary diagram for describing features of a light emitting display apparatus according to an embodiment of the present disclosure. Particularly, FIG. 11 is a graph illustrating luminance waveforms for each EM Off time in which the light emitting device does not emit light. In FIG. 11, the abscissa axis may denotes a time, and the ordinate axis may denote luminance.

As described above, an electronic device such as an electronic watch may be driven at a low frequency (Hz) to improve power consumption.

When an electronic device is driven at a low frequency (Hz), a flicker defect may occur due to cognitive characteristics, hysteresis characteristics, and a period in which the light emitting device does not emit light (hereinafter simply referred to as EM Off Time). In this case, it is impossible to reduce the flicker only by improving the hysteresis of the light emitting display panel.

That is, the threshold voltage of the transistor may change due to the hysteresis of the transistor, and thus, the current flowing to the light emitting device may change and the luminance of the light emitting device may change. Therefore, a luminance difference may occur in the refresh period and the anode reset period due to the hysteresis characteristics.

Moreover, due to other driving conditions of the light emitting display panel, a long EM Off Time is required. However, the longer the EM Off Time, the longer the non-light emission time of the light emitting device, and thus the flicker can be perceived severely. That is, the EM Off Time when the light emitting display apparatus is driven at a low frequency (Hz) is longer than the EM Off Time when the light emitting display apparatus is driven at a high frequency (Hz), and thus the time in which dark luminance occurs increases and flickers can be perceived severely.

There is a way to decrease a flicker by reducing EM Off Time, but due to other conditions, simply reducing EM Off Time is difficult to use.

An oxide thin film transistor using an oxide semiconductor has better hysteresis properties than a low temperature polysilicon (LTPS) using a polycrystalline semiconductor.

Accordingly, in the light emitting display apparatus according to the present disclosure, the driving transistor T2 may be formed of an oxide semiconductor.

Therefore, the light emitting display apparatus according to the present disclosure has excellent flicker characteristics, and thus the EM Off Time may be reduced.

That is, in the light emitting display apparatus according to the present disclosure, because the driving transistor T2 formed of an oxide semiconductor is used, hysteresis can be improved, and thus, the EM Off Time can be reduced even when the light emitting display apparatus is driven at a low frequency (Hz). Moreover, because the EM Off Time can be reduced, the difference in luminance between the light emission time and the non-light emission time may be reduced, and thus the flicker may be reduced.

For example, as illustrated in FIG. 11, in the anode reset period AR, in a case where the luminance difference of the light emitting device when the EM Off time is 8H is X, the luminance difference of the light emitting device when the EM Off time is 1H is Y, and Y is less than X. Here, 1H may correspond to, for example, a period in which the data voltage Vdata is supplied to the data line.

That is, as the EM Off time decreases, the luminance difference in the anode reset period may decrease, and thus, the flicker can be reduced.

As described above, in the light emitting display apparatus according to the present disclosure, the EM Off Time can be reduced because the driving transistor can be formed of an oxide thin film transistor with excellent hysteresis characteristics.

Therefore, as illustrated in FIG. 10, the EM Off time of each of the first light emitting control signal EM(n−2) and the second light emitting control signal EM(n) may be 1H in the anode reset period AR. That is, when the first light emitting control signal EM(n−2) and the second light emitting control signal EM(n) have a high level, the light emitting device does not output light, and thus, in FIG. 10, the period in which the first light emitting control signal EM(n−2) and the second light emitting control signal EM(n) have a high level may be the EM Off time.

Because the EM Off time of the first light emitting control signal EM(n−2) and the second emitting control signal EM(n) may be reduced to 1H, flickers may be reduced in the light emitting display apparatus according to the present disclosure.

To provide an additional description, the period in which the first light emitting transistor T5 is turned off in each frame period of the anode reset period AR may be less than the period in which the first light emitting transistor is turned off in the refresh period RF, and thus the flicker may be reduced.

Moreover, in order to reduce flicker in the light emitting display apparatus according to the present disclosure, the compensation voltage Var can be supplied to the initialization line IL during the anode reset period AR, as described with reference to FIGS. 8 and 9.

In this case, as illustrated in FIG. 8, even when the EM Off time of the first light emitting control signal EM(n−2) and the second light emitting control signal EM(n) is 8H, flicker may be reduced.

That is, in the light emitting display apparatus according to the present disclosure, a driving transistor T2 is formed using an oxide semiconductor in order to reduce flicker.

In this case, the EM Off time in the anode reset period AR may be reduced to, for example, 1H.

Moreover, in the light emitting display apparatus according to the present disclosure, even when the EM Off time in the anode reset period AR is the same as the EM Off time in the refresh period RF, the flicker may be reduced if the compensation voltage Var is supplied to the initialization line IL in the anode reset period AR.

Furthermore, the light emitting display apparatus according to the present disclosure can make the EM Off time in the anode reset period AR less than the EM Off time in the refresh period RF and supply the compensation voltage Var to the initialization line IL in the anode reset period AR, and thus the flicker can be reduced.

FIG. 12 is a cross-sectional view illustrating a stacked form of a light emitting display panel applied to a light emitting display apparatus according to an embodiment of the present disclosure. That is, FIG. 12 is an exemplary diagram for describing a stacked structure of a light emitting display panel applied to the present disclosure. Accordingly, the terms described with reference to FIG. 12 may be different from the terms described with reference to FIGS. 1 to 11. That is, FIG. 12 is used as an example for describing a stacked structure of a light emitting display panel applied to the present disclosure independently of FIGS. 1 to 11.

Particularly, in FIG. 12, a cross-sectional view of a light emitting display panel in which two switching thin film transistors TFT1 and TFT2 and one capacitor CST are disposed is illustrated. The two thin film transistors TFT1 and TFT2 may be a thin film transistor formed of a polycrystalline semiconductor material and an oxide thin film transistor TFT2 formed of an oxide semiconductor material. In this case, the thin film transistor formed of a polycrystalline semiconductor material is referred to as a polycrystalline thin film transistor TFT1, and the thin film transistor formed of an oxide semiconductor material is referred to as an oxide thin film transistor TFT2.

The polycrystalline thin film transistor TFT1 illustrated in FIG. 12 may be a thin film transistor connected to a light emitting device ED, and the oxide thin film transistor TFT2 may be a thin film transistor connected to a capacitor CST.

A pixel P includes a light emitting device ED and a pixel driving circuit which supplies a driving current to the light emitting device ED. The pixel driving circuit is disposed on a substrate 111, and the light emitting device ED is disposed on the pixel driving circuit. Moreover, an encapsulation layer 120 is disposed on the light emitting device ED. The encapsulation layer 120 protects the light emitting device ED.

The pixel driving circuit may be referred to as a pixel array unit including a driving thin film transistor, a switching thin film transistor, and a capacitor.

Moreover, the light emitting device ED may be referred to as an array unit including an anode electrode, a cathode electrode, and a light emitting layer disposed between them for light emission.

In an embodiment, the driving thin film transistor and at least one switching thin film transistor may use an oxide semiconductor as an active layer. Thin film transistors using oxide semiconductor material as an active layer have excellent leakage current blocking effects and are relatively cheaper than thin film transistors using polycrystalline semiconductor material as an active layer in a manufacturing cost. Therefore, in order to reduce power consumption and manufacturing cost, a pixel driving circuit according to one embodiment may include a driving thin film transistor using an oxide semiconductor material and at least one switching thin film transistor using an oxide semiconductor material. For example, in the pixel driving circuit illustrated in FIG. 2, the driving transistor T2 and the scan transistor T3 may be oxide thin film transistors.

All thin film transistors configuring the pixel driving circuit may be implemented by using an oxide semiconductor material, or only some switching thin film transistors may be implemented by using an oxide semiconductor material.

However, because thin film transistors using oxide semiconductor materials are difficult to secure reliability, and thin film transistors using polycrystalline semiconductor materials have fast operating speed and excellent reliability, one embodiment may include both switching thin film transistors using oxide semiconductor materials and switching thin film transistors using polycrystalline semiconductor materials.

The substrate 111 may be implemented as a multi-layer in which an organic layer and an inorganic layer are alternately stacked. For example, the substrate 111 may be stacked with an organic layer such as polyimide and an inorganic layer such as silicon oxide ($SiO_2$) alternately.

A lower buffer layer 112*a* is provided on the substrate 111. The lower buffer layer 112*a* is used for blocking moisture, etc. which may penetrate from the outside, and can be used by stacking a silicon oxide (SiO2) layer, etc. in a multilayer. An auxiliary buffer layer 112*b* may be further provided on the lower buffer layer 112*a* to protect the device in the light emitting display panel from moisture permeation.

A polycrystalline thin film transistor TFT1 is formed on the substrate 111. The polycrystalline thin film transistor TFT1 may use a polycrystalline semiconductor as an active layer. The polycrystalline thin film transistor TFT1 includes a first active layer ACT1 including a channel through which electrons and holes move, a first gate electrode GE1, a first source electrode SD1, and a first drain electrode SD2.

The first active layer ACT1 includes a first channel region, a first source region disposed on one side and a first drain region disposed on the other side with the first channel region in between.

The first source region and the first drain region are regions where intrinsic polycrystalline semiconductor materials are doped with group 5 or group 3 impurity ions, such as phosphorus (P) or boron (B) at a predetermined concentration to form a conductor. The first channel region is a region in which the polycrystalline semiconductor material maintains an intrinsic state and the first channel region provides a path through which electrons or holes move.

The polycrystalline thin film transistor TFT1 includes a first gate electrode GE1 overlapping the first channel region of the first active layer ACT1. A first gate insulation layer 113 is disposed between the first gate electrode GE1 and the first active layer ACT1. The first gate insulation layer 113 may be formed by stacking an inorganic layer such as a silicon oxide ($SiO_2$) layer and silicon nitride (SiNx) layer, or the like, in a single layer or a multilayer.

In one embodiment, the polycrystalline thin film transistor TFT1 is a top gate structure in which the first gate electrode GE1 is provided above the first active layer ACT1. Accordingly, a first electrode CST1 included in a capacitor CST and a light blocking layer LS included in the oxide thin film transistor TFT2 may be formed of the same material as the first gate electrode GE1. The mask process may be reduced by forming the first gate electrode GE1, the first electrode CST1, and the light blocking layer LS through one mask process.

The first gate electrode GE1 is made of a metal material. For example, the first gate electrode GE1 may be a single layer or multilayer made of any one of molybdenum (Mo), aluminum (Al), chromium (Cr), gold (Au), titanium (Ti), nickel (Ni), neodymium (Nd), and copper (Cu), or alloys thereof, but is not limited thereto.

A first interlayer insulation layer 114 is disposed on the first gate electrode GE1. The first interlayer insulation layer 114 may be formed of silicon oxide (SiO2), silicon nitride (SiNx), or the like.

The light emitting display panel 100 may further include an upper buffer layer 115, a second gate insulation layer 116, and a second interlayer insulation layer 117 which are sequentially disposed on the first interlayer insulation layer 114. The polycrystalline thin film transistor TFT1 may include a first source electrode SD1 and a first drain electrode SD2 connected to the first source region and the first drain region, respectively.

The first source electrode SD1 and the first drain electrode SD2 may be a single layer or multiple layer made of any one of molybdenum (Mo), aluminum (Al), chromium (Cr), gold (Au), titanium (Ti), nickel (Ni), neodymium (Nd), and copper (Cu), or alloys thereof, but are not limited thereto.

The upper buffer layer 115 provides the basis for separating the second active layer ACT2 of the oxide thin film transistor TFT2 made of the oxide semiconductor material from the first active layer ACT1 made of the polycrystalline semiconductor material, and for forming the second active layer ACT2.

The second gate insulation layer 116 covers the second active layer ACT2 of the oxide thin film transistor TFT2. Because the second gate insulation layer 116 is formed on the second active layer ACT2 formed of an oxide semiconductor material, the second gate insulation layer 116 is implemented as an inorganic layer. For example, the second gate insulation layer 116 may be silicon oxide ($SiO_2$), silicon nitride (SiNx), or the like.

The second gate electrode GE2 is made of a metal material. For example, the second gate electrode GE2 may be a single layer or multilayer made of any one of molybdenum (Mo), aluminum (Al), chromium (Cr), gold (Au), titanium (Ti), nickel (Ni), neodymium (Nd), and copper (Cu), or alloys thereof, but is not limited thereto.

The oxide thin film transistor TFT2 includes a second active layer ACT2 which is formed on the upper buffer layer 115 and formed of an oxide semiconductor material, a second gate electrode GE2 on the second gate insulation layer 116, a second source electrode SD3 on the second interlayer insulation layer 117, and a second drain electrode SD4 on the second interlayer insulation layer 117.

The second active layer ACT2 includes an intrinsic second channel region made of an oxide semiconductor material and undoped with impurities, and a second source region and a second drain region that are doped with impurities to be conductors.

The oxide thin film transistor TFT2 further includes a light blocking layer LS which is provided below the upper buffer layer 115 and overlaps the second active layer ACT2. The light blocking layer LS may secure reliability of the oxide thin film transistor TFT2 by blocking light incident on the active layer 401. The light blocking layer LS may be formed of the same material as the first gate electrode GE1 and may be formed on an upper surface of the first gate insulation layer 113. The light blocking layer LS may be electrically connected to the second gate electrode GE2 to form a dual gate.

The second source electrode SD3 and the second drain electrode SD4 may be formed of the same material on the second interlayer insulation layer 117 together with the first source electrode SD1 and the first drain electrode SD2, thereby reducing the number of mask processes.

A capacitor CST may be implemented by placing the second electrode CST2 on the first interlayer insulation layer 114 to overlap the first electrode CST1. The second electrode CST2 may be, for example, a single layer or a multilayer made of any one of molybdenum (Mo), aluminum (Al), chromium (Cr), gold (Au), titanium (Ti), nickel (Ni), neodymium (Nd), and copper (Cu), or alloys thereof.

The capacitor CST stores the data voltage applied through the data line DL for a certain period and then provides it to the light emitting device ED. The capacitor CST includes two electrodes corresponding to each other and a dielectric disposed therebetween. A first interlayer insulation layer 114 is disposed between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. However, the present disclosure is not limited thereto, and the connection relationship of the capacitor CST may be changed based on the pixel driving circuit.

A first planarization layer 118 and a second planarization layer 119 are sequentially provided on the pixel driving circuit to planarize the upper end of the pixel driving circuit. The first planarization layer 118 and the second planarization layer 119 may be an organic layer such as polyimide or acrylic resin.

Moreover, a light emitting device ED is formed on the second planarization layer 119.

The light emitting device ED includes an anode electrode ANO, a cathode electrode CAT, and a light emitting layer EL disposed between the anode electrode ANO and the cathode electrode CAT. When a low potential voltage connected to the cathode electrode CAT is commonly used in pixel driving circuits, the anode electrode ANO is provided as a separate electrode for each subpixel.

The light emitting device ED is electrically connected to a driving device through an intermediate electrode CNE disposed on the first planarization layer 118. Specifically, the anode electrode ANO of the light emitting device ED and the first source electrode SD1 of the polycrystalline thin film transistor TFT1 configuring the pixel driving circuit are connected to each other by an intermediate electrode CNE.

The anode electrode ANO is connected to the intermediate electrode CNE exposed through a contact hole penetrating the second planarization layer 119. Moreover, the intermediate electrode CNE is connected to the first source electrode SD1 exposed through a contact hole penetrating through the first planarization layer 118.

The intermediate electrode CNE functions as a medium connecting the first source electrode SD1 and the anode electrode ANO. The intermediate electrode CNE may be formed of a conductive material such as copper (Cu), silver (Ag), molybdenum (Mo), or titanium (Ti).

The anode electrode ANO may be formed in a multi-layered structure including a transparent conductive layer and an opaque conductive layer having high reflection efficiency. The transparent conductive layer may be made of a material having a relatively large work function value such as indium-tin-oxide (ITO) or indium-zinc-oxide (IZO), and the opaque conductive layer may have a single layer structure or a multilayer structure including aluminum (Al), silver (Ag), copper (Cu), lead (Pb), molybdenum (Mb), titanium (Ti), or an alloy thereof. For example, the anode electrode ANO may be formed in a structure in which a transparent conductive layer, an opaque conductive layer, and a transparent conductive layer are sequentially stacked, or a structure in which a transparent conductive layer and an opaque conductive layer are sequentially stacked.

The light emitting layer EL is formed by stacking a hole-related layer, an organic light emitting layer, and an electron-related layer in order or in reverse order on the anode electrode ANO.

A bank layer BNK may be a pixel defining layer exposing the anode electrode ANO of each pixel P. The bank layer BNK may be formed of an opaque material (e.g., black material) to prevent light interference between adjacent pixels P. In this case, the bank layer BNK includes a light blocking material made of at least one of color pigment, an organic black, and carbon. A spacer may be further disposed on the bank layer BNK.

The cathode electrode CAT faces the anode electrode ANO with the light emitting layer EL therebetween and is formed on an upper surface and lateral surface of the light emitting layer EL. The cathode electrode CAT may be formed over the entire display area DA as one body. When the cathode electrode CAT is applied to an organic light emitting display apparatus of a front-emitting type, the cathode electrode CAT may be formed of a transparent conductive layer made of a material such as indium-tin-oxide (ITO) or indium-zinc-oxide (IZO).

An encapsulation layer 120 for preventing a moisture penetration may be further disposed on the cathode electrode CAT.

The encapsulation layer 120 can prevent external moisture or oxygen from penetrating into the light emitting device ED, which is vulnerable to external moisture or oxygen. To this end, the encapsulation layer 120 may include at least one inorganic encapsulation layer and at least one organic encapsulation layer, but is not limited thereto. In the present disclosure, the structure of the encapsulation layer 120 in which a first encapsulation layer 121, a second encapsulation layer 122, and a third encapsulation layer 123 are sequentially stacked will be described as an example.

The first encapsulation layer 121 is formed on the substrate 111 on which the cathode electrode CAT is formed. The third encapsulation layer 123 is formed on the substrate 111 on which the second encapsulation layer 122 is formed, and may be formed to surround an upper surface, a lower surface, and a lateral surface of the second encapsulation layer 122 together with the first encapsulation layer 121. The first encapsulation layer 121 and the third encapsulation layer 123 may minimize or prevent external moisture or oxygen from penetrating into the light emitting device ED. The first encapsulation layer 121 and the third encapsulation layer 123 may be formed of an inorganic insulation material capable of low-temperature deposition such as silicon nitride (SiNx), silicon oxide (SiOx), silicon oxynitride (SiON), or aluminum oxide ($Al_2O_3$). Because the first encapsulation layer 121 and the third encapsulation layer 123 are deposited in a low-temperature atmosphere, it is possible to prevent damage to the light emitting device ED vulnerable to the high-temperature atmosphere during the deposition process of the first encapsulation layer 121 and the third encapsulation layer 123.

The second encapsulation layer 122 can functions as a buffer to relieve stress between respective layer due to the bending of the light emitting display apparatus 10, and can planarizing the step between respective layers. The second encapsulation layer 122 may be formed on the substrate 111 on which the first encapsulation layer 121 is formed, and may be formed of a non-photosensitive organic insulation material such as acrylic resin, epoxy resin, phenolic resin, polyamide resin, polyimide resin, polyethylene and silicon oxycarbon (SiOC), or a photosensitive organic insulation material such as photoacryl, but is not limited thereto. When the second encapsulation layer 122 is formed through an inkjet method, a dam DAM may be disposed to prevent the second encapsulation layer 122 in a liquid state from diffusing to an edge of the substrate 111. The dam DAM may be disposed closer to the edge of the substrate 111 than the second encapsulation layer 122. By the dam DAM, it is possible to prevent the second encapsulation layer 122 from diffusing to a pad area where a conductive pad disposed at the outermost side of the substrate 111 is disposed.

The dam DAM is designed to prevent the diffusion of the second encapsulation layer 122, but when the second encapsulation layer 122 is formed beyond the height of the dam DAM during a manufacturing process thereof, the second encapsulation layer 122, which is an organic layer, may be exposed to the outside, and thus moisture or the like may easily penetrate into the light emitting device ED. Therefore, in order to prevent this, at least 10 dams may be repeatedly formed.

The dam DAM may be disposed on the second interlayer insulation layer 117 of the non-display area NDA.

Moreover, the dam DAM may be formed simultaneously with the first planarization layer 118 and the second planarization layer 119. For example, when the first planarization layer 118 is formed, a lower layer of the dam DAM is formed together, and when the second planarization layer 119 is formed, an upper layer of the dam DAM is formed together, and thus the dam DAM may be formed in a double-layer structure.

Therefore, the dam DAM may be formed of the same material as the first planarization layer 118 and the second planarization layer 119, but is not limited thereto.

The dam DAM may be formed to overlap a low potential driving power line VSS. For example, the low potential driving power line VSS may be formed in a lower layer of a region in which the dam DAM is provided in the non-display area NDA.

The low potential driving power line VSS and a gate driver 200 formed in GIP (Gate In Panel) type are formed to surround the outer portion of the display panel, and the low potential driving power line VSS may be provided outside the gate driver 200. Moreover, the low potential driving power line VSS may be connected to the cathode electrode CAT to supply a common voltage. The gate driver 200 is simply illustrated in a plan view and a cross-sectional view, but can be formed by using a thin film transistor having the same structure as the thin film transistor in the display area DA.

The low potential driving power line VSS is disposed outside the gate driver 200. The low potential driving power line VSS is disposed outside the gate driver 200 and surrounds the display area DA. For example, the low potential driving power line VSS may be made of the same material as the first gate electrode GE1, but is not limited thereto, and thus may be made of the same material as the second electrode CST2 or the first source and drain electrodes SD1 and SD2.

Moreover, the low potential driving power line VSS may be electrically connected to the cathode electrode CAT. The low potential driving power line VSS may supply the low potential driving voltage EVSS to a plurality of pixels P of the display area DA.

A touch layer may be disposed on the encapsulation layer 120. In the touch layer, a touch buffer layer 151 may be provided between a touch sensor metal including touch electrode connection lines 152 and 154 and touch electrodes 155 and 156, and the cathode electrode CAT of the light emitting device ED.

The touch buffer layer 151 can prevent liquid chemical (for example, developers or etchants), which is used during the manufacturing process of the touch sensor metal disposed on the touch buffer layer 151, or moisture from the outside from penetrating into the light emitting layer EL including organic material. Accordingly, the touch buffer layer 151 may prevent damage to the light emitting layer EL which is vulnerable to the liquid chemical or the moisture.

The touch buffer layer 151 is made of an organic insulation material which can be formed at a low temperature below a certain temperature (e.g., 100 degrees (° C.)) and has a low dielectric constant of 1 to 3 to prevent damage to the light emitting layer EL including organic substances vulnerable to high temperatures. For example, the touch buffer layer 151 may be formed of an acrylic, epoxy, or siloxane-based material. The touch buffer layer 151, which is formed of an organic insulation material and has planarization performance, can prevent a damage to the encapsulation layer 120 and breaking of the touch sensor metal formed on the touch buffer layer 151 due to the bending of the light emitting display apparatus 10.

According to the mutual-capacitance-based touch sensor structure, the touch electrodes 155 and 156 are provided on the touch buffer layer 151, and the touch electrodes 155 and 156 may be arranged to cross each other.

The touch electrode connection line 152 may electrically connect the touch electrodes 155 and 156. The touch electrode connection lines 152 and 154 and the touch electrodes 155 and 156 may be provided on different layers with a touch insulation layer 153 therebetween.

The touch electrode connection lines 152 and 154 may be disposed to overlap a bank layer, thereby preventing an aperture ratio from decreasing.

A part of the touch electrode connection line 152 may extend through the upper and lateral end of the encapsulation layer 120 and the upper and lateral end of the dam DAM to be electrically connected to the touch driving circuit through the touch pad PAD.

A part of the touch electrode connection line 152 can receive a touch driving signal from the touch driving circuit and transmit it to the touch electrodes 155 and 156, and transmit a touch sensing signal from the touch electrodes 155 and 156 to the touch driving circuit.

A touch passivation layer 157 may be disposed on the touch electrodes 155 and 156. In FIG. 12, the touch passivation layer 157 is illustrated as being disposed only on the touch electrodes 155 and 156, but is not limited thereto, and thus the touch passivation layer 157 may extend to before or after the dam DAM to be disposed on the touch electrode connection line 152.

Moreover, a color filter may be further provided on the encapsulation layer 120, and the color filter may be provided on the touch layer or between the encapsulation layer 120 and the touch layer.

The light emitting display apparatus according to the present disclosure described above has the following characteristics.

That is, a light emitting display apparatus according to the present disclosure comprises a light emitting display panel provided with a pixel including a pixel driving circuit and a light emitting device and a gate driver supplying gate signals to the pixel driving circuit, wherein the pixel driving circuit comprises a switching transistor, a driving transistor, and a first light emitting transistor, the first light emitting transistor is connected between an anode of the light emitting device and a first node, the driving transistor controls the size of the current supplied to the light emitting device through the first node and the first light emitting transistor, the switching transistor controls the supply of a data voltage to the light emitting device through the first node, and during the use of the light emitting display apparatus, one second is divided into a refresh period and an anode reset period, the switching transistor is turned on only during the refresh period, and the driving transistor is formed of an oxide semiconductor.

Each of the switching transistor and the first light emitting transistor is formed of a polycrystalline semiconductor.

The gate driver turns on the first light emitting transistor M (M is a natural number of 2 or more) times per second and turns on the switching transistor once only during the refresh period.

The first light emitting transistor is turned on once during the refresh period, the first light emitting transistor is turned on M−1 (M is a natural number of 2 or more) times during the anode reset period, and the switching transistor is turned on once only during the refresh period.

A period during which the first light emitting transistor is turned off in each frame period of the anode reset period is shorter (or smaller) than a period during which the first light emitting transistor is turned off in the refresh period.

The switching transistor is connected between the first node and a data line provided in the light emitting display panel.

A first voltage is supplied to a first electrode of the driving transistor, and a second electrode of the driving transistor is connected to the first node, and the pixel driving circuit further comprises: a second light emitting transistor, a first electrode of the second light emitting transistor being connected to a first voltage line to which the first voltage is supplied, and a second electrode of the second light emitting transistor being connected to the first electrode of the driving transistor; a scan transistor driven by a first scan signal, a first electrode of the scan transistor being connected to a gate of the driving transistor, and a second electrode of the scan transistor being connected to the first electrode of the driving transistor; an initialization transistor, a first electrode of the initialization transistor being connected to the anode of the light emitting device, a second electrode of the initialization transistor being connected to an initialization line to which an initialization voltage or a compensation voltage being supplied, and a gate of the initialization transistor being connected to a gate of the first light emitting transistor, and a storage capacitor connected between the gate of the driving transistor and the anode of the light emitting device.

The first light emitting transistor and the second light emitting transistor are P-type transistors, and the initializing transistor is an N-type transistor.

The initialization transistor is turned on when the first light emitting transistor is turned off in the anode reset period.

In the anode reset period, when the initialization transistor is turned on, the compensation voltage is supplied to the anode of the light emitting device through the initialization transistor, and the compensation voltage is different from the initialization voltage supplied to the anode of the light emitting device through the initialization transistor in the refresh period.

The compensation voltage is set to a voltage that does not affect the luminance of light output from the light emitting device or a value that has a minimal effect on the luminance of light output from the light emitting device.

The compensation voltage is supplied to the anode of the light emitting device just before the light is output from the light emitting device.

The compensation voltage is set to a value greater than the initialization voltage.

Each of the driving transistor and the scan transistor is formed of an oxide semiconductor, and each of the switching transistor, the first light emitting transistor, the second light emitting transistor, and the initializing transistor is formed of a polycrystalline semiconductor.

The pixel driving circuit further comprises an initialization transistor, a first electrode of the initialization transistor is connected to the anode of the light emitting device, a second electrode of the initialization transistor is connected to an initialization line to which an initialization voltage or a compensation voltage is supplied, and a gate of the initialization transistor is connected to a gate of the first light emitting transistor.

The initialization transistor is turned on when the first light emitting transistor is turned off in the anode reset period.

When the initialization transistor is turned on, the compensation voltage is supplied to the anode of the light emitting device through the initialization transistor, and the compensation voltage is different from the initialization voltage supplied to the anode of the light emitting device through the initialization transistor in the refresh period.

When the first light emitting transistor is turned off in the anode reset period, a compensation voltage is supplied to the anode of the light emitting device, and the compensation voltage is different from an initialization voltage supplied to the anode of the light emitting device through the initialization transistor in the refresh period.

In the refresh period, a data voltage is supplied to the driving transistor through a data line provided in the light emitting display panel, the switching transistor, and the first node, and light is output from the light emitting device on the basis of the size of the data voltage, and in the anode reset period, the first light emitting transistor is repeatedly turned on and off, and light is output from the light emitting device.

The anode reset period is longer than the refresh period.

According to the present disclosure, because the driving transistor can be formed of an oxide semiconductor, the leakage current of the driving transistor can be reduced, and thus the data voltage supplied to the driving transistor during the refresh period can be normally maintained during the anode reset period. Therefore, the luminance of light output from the light emitting device during the anode reset period can be maintained the same or similar to the luminance of light output from the light emitting device during the refresh period. Accordingly, flickers are reduced, and the quality of the light emitting display device may be enhanced.

According to present disclosure, because the anode of the light emitting device can be reset by the compensation voltage even during the anode reset period, the luminance of light output from the light emitting device during the anode reset period can be maintained the same or similar to the luminance of light output from the light emitting device during the refresh period. Accordingly, flickers are reduced, and the quality of the light emitting display apparatus can be enhanced.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the light emitting display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A light emitting display apparatus, comprising:

a light emitting display panel provided with a pixel including a pixel driving circuit and a light emitting device; and a gate driver configured to supply gate signals to the pixel driving circuit, wherein the pixel driving circuit comprises a switching transistor, a driving transistor, and a first light emitting transistor, the first light emitting transistor is connected between an anode of the light emitting device and a first node, the driving transistor is configured to control a size of the current supplied to the light emitting device through the first node and the first light emitting transistor, the switching transistor is configured to control a supply of a data voltage to the light emitting device through the first node, during a use of the light emitting display apparatus, one second is divided into a refresh period and an anode reset period, the switching transistor is turned on only during the refresh period, and the driving transistor is formed of an oxide semiconductor.

2. The light emitting display apparatus of claim 1, wherein each of the switching transistor and the first light emitting transistor is formed of a polycrystalline semiconductor.

3. The light emitting display apparatus of claim 1, wherein the gate driver turns on the first light emitting transistor M times per second and turns on the switching transistor once only during the refresh period, wherein M is a natural number of 2 or more.

4. The light emitting display apparatus of claim 1, wherein the first light emitting transistor is turned on once during the refresh period, the first light emitting transistor is turned on M−1 times during the anode reset period, wherein M is a natural number of 2 or more, and the switching transistor is turned on once only during the refresh period.

5. The light emitting display apparatus of claim 1, wherein a period during which the first light emitting transistor is turned off in each frame period of the anode reset period is shorter than a period during which the first light emitting transistor is turned off in the refresh period.

6. The light emitting display apparatus of claim 1, wherein the switching transistor is connected between the first node and a data line provided in the light emitting display panel.

7. The light emitting display apparatus of claim 1, wherein a first voltage is supplied to a first electrode of the driving transistor, and a second electrode of the driving transistor is connected to the first node, and the pixel driving circuit further comprises:

a second light emitting transistor, a first electrode of the second light emitting transistor being connected to a first voltage line to which the first voltage is supplied, and a second electrode of the second light emitting transistor being connected to the first electrode of the driving transistor;

a scan transistor driven by a first scan signal, a first electrode of the scan transistor being connected to a gate of the driving transistor, and a second electrode of the scan transistor being connected to the first electrode of the driving transistor;

an initialization transistor, a first electrode of the initialization transistor being connected to the anode of the light emitting device, a second electrode of the initialization transistor being connected to an initialization line to which an initialization voltage or a compensation voltage being supplied, and a gate of the initialization transistor being connected to a gate of the first light emitting transistor; and a storage capacitor connected between the gate of the driving transistor and the anode of the light emitting device.

8. The light emitting display apparatus of claim 7, wherein the first light emitting transistor and the second light emitting transistor are P-type transistors, and the initializing transistor is an N-type transistor.

9. The light emitting display apparatus of claim 8, wherein in the anode reset period, when the initialization transistor is turned on, a compensation voltage is supplied to the anode of the light emitting device through the initialization transistor, and the compensation voltage is different from the initialization voltage supplied to the anode of the light emitting device through the initialization transistor in the refresh period.

10. The light emitting display apparatus of claim 9, wherein the compensation voltage is set to a voltage that does not affect a luminance of light output from the light emitting device or a value that has a minimal effect on the luminance of light output from the light emitting device.

11. The light emitting display apparatus of claim 9, wherein the compensation voltage is supplied to the anode of the light emitting device just before the light is output from the light emitting device.

12. The light emitting display apparatus of claim 9, wherein the compensation voltage is set to a value greater than the initialization voltage.

13. The light emitting display apparatus of claim 7, wherein the initialization transistor is turned on when the first light emitting transistor is turned off in the anode reset period.

14. The light emitting display apparatus of claim 7, wherein each of the driving transistor and the scan transistor is formed of an oxide semiconductor, and each of the switching transistor, the first light emitting transistor, the second light emitting transistor, and the initializing transistor is formed of a polycrystalline semiconductor.

15. The light emitting display apparatus of claim 1, wherein the pixel driving circuit further comprises an initialization transistor, a first electrode of the initialization transistor is connected to the anode of the light emitting device, a second electrode of the initialization transistor is connected to an initialization line to which an initialization voltage or a compensation voltage is supplied, and a gate of the initialization transistor is connected to a gate of the first light emitting transistor.

16. The light emitting display apparatus of claim 15, wherein the initialization transistor is turned on when the first light emitting transistor is turned off in the anode reset period.

17. The light emitting display apparatus of claim 16, wherein when the initialization transistor is turned on, the compensation voltage is supplied to the anode of the light emitting device through the initialization transistor, and the compensation voltage is different from the initialization voltage supplied to the anode of the light emitting device through the initialization transistor in the refresh period.

18. The light emitting display apparatus of claim 1, wherein when the first light emitting transistor is turned off in the anode reset period, a compensation voltage is supplied to the anode of the light emitting device, and the compensation voltage is different from an initialization voltage supplied to the anode of the light emitting device through the initialization transistor in the refresh period.

19. The light emitting display apparatus of claim 1, wherein in the refresh period, a data voltage is supplied to the driving transistor through a data line provided in the light emitting display panel, the switching transistor, and the first node, and light is output from the light emitting device on a basis of a size of the data voltage, and in the anode reset period, the first light emitting transistor is repeatedly turned on and off, and light is output from the light emitting device.

20. The light emitting display apparatus of claim 1, wherein the anode reset period is longer than the refresh period.

* * * * *